(12) United States Patent
Danglas et al.

(10) Patent No.: US 12,478,652 B2
(45) Date of Patent: *Nov. 25, 2025

(54) BACTERIOPHAGE THERAPY

(71) Applicants: FERRING B.V., Hoofddorp (NL); INSTITUT PASTEUR, Paris (FR)

(72) Inventors: Pascal Danglas, Saint-Prex (CH); Laurent Debarbieux, Paris (FR)

(73) Assignees: Ferring B.V., Hoofddorp (NL); Institut Pasteur, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,221

(22) Filed: Jan. 30, 2024

(65) Prior Publication Data
US 2024/0342230 A1  Oct. 17, 2024

Related U.S. Application Data

(62) Division of application No. 17/353,337, filed on Jun. 21, 2021, now Pat. No. 11,918,613, which is a division of application No. 14/787,581, filed as application No. PCT/EP2014/058840 on Apr. 30, 2014, now Pat. No. 11,040,078.

(30) Foreign Application Priority Data

Apr. 30, 2013  (EP) .................................. 13305568

(51) Int. Cl.
| | |
|---|---|
| *A61K 35/76* | (2015.01) |
| *A61K 9/00* | (2006.01) |
| *C12N 7/00* | (2006.01) |

(52) U.S. Cl.
CPC ............ *A61K 35/76* (2013.01); *A61K 9/0053* (2013.01); *C12N 7/00* (2013.01); *C12N 2795/10021* (2013.01); *C12N 2795/10132* (2013.01); *C12N 2795/10171* (2013.01); *Y02A 50/30* (2018.01)

(58) Field of Classification Search
CPC ...... A61P 1/00; A61P 1/04; A61P 1/12; A61K 9/0053; A61K 35/76; C12N 7/00; C12N 2795/10021; C12N 2795/10171; C12N 2795/10132; Y02A 50/30
See application file for complete search history.

(56) References Cited

U.S. PATENT DOCUMENTS 11,040,078 B2 *  6/2021  Danglas .................... A61P 1/04
11,918,613 B2     3/2024  Danglas et al.

FOREIGN PATENT DOCUMENTS

| EP | 2 377 883 A1 | 10/2011 |
|---|---|---|
| WO | WO-01/93904 A1 | 12/2001 |
| WO | WO-02/11549 | 2/2002 |
| WO | WO-2012/036580 | 3/2012 |
| WO | WO-2013/045863 | 4/2013 |

OTHER PUBLICATIONS

Baumgart et al., "Culture independent analysis of ileal mucosa reveals a selective increase in invasive Escherichia coli of novel phylogeny relative to depletion of Clostridiales in Crohn's disease involving the ileum," The ISME Journal, vol. 1, pp. 403-418, Jul. 2007.
Bringer et al, "The Crohn's disease-associated adherent-invasive Escherichia coli strainLF82 replicates in mature phagolysosomes within J774 macrophages," Cell Microbial., vol. 8, No. 3, pp. 471-484, Mar. 2006 (Abstract).
Brossow, "Bacteriophage Therapy: Potential and Problems," Pathogenesis, pp. 267-273,2009.
Brossow, "Phage Therapy: the Western Perspective," Bacteriophage, McGrath et al., eds., Chapter 6, pp. 59-192, 2007.
Carvalho et al., "Crohn's disease adherent-invasive Escherichia coli colonize and induce strong gut inflammation in transgenic mice expressing human CEACAM," The Journal ofExperimental Medicine, vol. 206, No. 10, pp. 2179-2189, Sep. 2009.
Chibani-Chennoufi et al., "In Vitro and In Vivo BacteriolyticActivities of Escherichia coliPhages: Implications for Phage Therapy," Antimicrobial Agents and Chemotherapy, vol. 48, No. 7, pp. 2558-2569, Jul. 2004.
Conte et al., "Adherent-invasive Escherichia coli (AIEC) in pediatric Crohn's disease patients: phenotypic and genetic pathogenic features," BMC Research Notes, vol. 7, No. 748, pp. 1-12, Oct. 2014.
Darfeuille-Michaud et al., "High Prevalence of Adherent-Invasive Escherichia coli Associated with Ileal Mucosa in Crohn's Disease," vol. 127, pp. 412-421, Aug. 2004.
Darfeuille-Michaud et al., "Presence of Adherent Escherichia coli Strains Ileal Mucosa of Patients With Crohn's Disease," Gastroenterology, vol. 115, No. 6, pp. 1405-1413, Dec. 1998.
Darfeuille-Michaud, "Adherent-invasive Escherichia coli: a putative new E. coli pathotype associated with Crohn's disease," Int. J. Med. Microbial., vol. 292, pp. 185-193, 2002.
Denou et al., "T4 phages against Escherichia coli diarrhea: Potential and problems," Virology, vol. 388, pp. 21-30, Apr. 2009.

(Continued)

*Primary Examiner* — Sean C. Barron
(74) *Attorney, Agent, or Firm* — Foley & Lardner LLP

(57) ABSTRACT

The subject invention provides a pharmaceutical composition comprising: (i) at least one bacteriophage strain(s) capable of producing a lytic infection in an adherent-invasive Escherichia coli strain; and (ii) a pharmaceutically acceptable carrier; for the treatment of inflammatory bowel disease.
The subject invention further provides a method of treating inflammatory bowel disease comprising administering to a subject in need thereof at least one bacteriophage strain capable of producing a lytic infection in an adherent-invasive Escherichia coli strain thereby treating the subject. The subject invention also provides new bacteriophage strains.

14 Claims, No Drawings

Specification includes a Sequence Listing.

(56) References Cited

OTHER PUBLICATIONS

Dogan et al., "Multidrug Resistance is Common in *Escherichia coli* Associated with Ileal Crohn's Disease," Inflamm. Bowel Dis., vol. 19, No. 1, pp. 141-150, Jan. 2013.
Galtier et al., "Bacteriophages targeting adherent invasive *Escherichia Coli* strains as a promising new treatment for Crohn's disease," Journal of Crohn's and Colitis, 11(7):840-847 (Jan. 2017).
Gorski et al., "Bacteriophages in Medicine," Bacteriophage, McGrath et al., eds., Chapter 5, pp. 125-158, 2007.
International Search Report issued on Oct. 8, 2014 in application No. PCT/EP2014/058840.
Kutter et al., Phage Therapy in Clincial Practice: Treatment of Human Infections, Current Pharmaceutical Biotechnology, vol. 11, pp. 69-86, 2010.
Kutter, "Bacteriphage Therapy: Past and Present," Pathogenesis, pp. 258-266, 2009.
Lepage et al., "Dysbiosis in inflammatory bowel disease: a role for bacteriophages?," Gut, vol. 57, pp. 424-425, 2008.
Luslak-Szelachowska et al., "*Escherichia coli* bacteriophages in human stool of patients with gastrointestinal tract diseases," Gastroenterologia Polska, vol. 15, No. 2, pp. 87-90, 2008.
Maura et al., "Intestinal colonization by enteroaggregative *Escherichia coli* supports long-term bacteriophage replication in mice," Environmental Microbiology, pp. 1-11, 2011.
Maura et al., "Intestinal colonization by enteroaggregative *Escherichia coli* supports long-term bacteriophage replication in mice," Environmental Microbiology (2012) 14(8), pp. 1844-1854.
Maura et al., "On the interactions between virulent bacteriophages and bacteria in the gut," Bacteriophage, vol. 2, No. 4, pp. 229-233, Oct./Nov./Dec. 2012.
Merril et al., "The prospect for bacteriophage therapy in Western medicine," Nature Reviews, vol. 2, pp. 489-497, Jun. 2003.
Murugananthan et al., "Clinical Risk Factors for Crohn's Disease Postoperative Recurrence are Reflected in Alterations in Mucosally Adherent Microbiota at Surgical Resection," Gastroenterology, vol. 142, No. 5, Suppl. 1, p. S679, May 2012.
Niu et al., "Host range and lytic capability of four bacteriophages against bovine and clinical human isolates of Shiga toxin-producing *Escherichia coli* O157:H7," Journal of AppliedMicrobiology, vol. 107, pp. 646-656, 2009.
Office Action dated May 28, 2019 in Japanese Application No. 2016-511060.
Reyes et al., "Viruses in the faecal microbiota of monozygotic twins and their mothers," Nature, vol. 466, pp. 334-338, Jul. 2010.
Rolhion, "Adherent-Invasive *Escherichia coli* in Inflammatory Bowel Disease," Inflamm. Bowel Dis., vol. 13, No. 10, pp. 1277-1283, Oct. 2007.
Sheng et al., "Application of Bacteriophages to Control Intestinal *Escherichia coli* O157:H7 Levels in Ruminants," Applied and Environmental Microbiology, vol. 72, No. 8, pp. 5359-5366, Aug. 2006.
Stone, "Stalin's Forgotten Cure," Science, vol. 298, pp. 728-731, Oct. 2002.
Strober, "Adherent-invasive *E. coli* in Crohn disease: bacterial "agent provocateur"," The Journal of Clinical Investigation, vol. 121, pp. 841-844, 2011.
Sulakvelidze et al., "Bacteriophage Therapy in Humans," Bacteriophages—Biology and Applications, Chapter 14, pp. 381-436, 2004.
Villegas et al. "The genome and proteome of a virulent *Escherichia coli* O157:H7 bacteriophage closely resembling *Salmonella* phage Felix O1" (Virology Journal (2009), 6:41. (Year: 2009).
Villegas et al., "The genome and proteome of a virulent *Escherichia coli* O157:H7 bacteriophage closely resembling *Salmonella* phage Felix 01," Virology Journal, vol. 6, No. 41, pp. 1-5, Apr. 2009.
Wegrzyn et al., "Modulation of the susceptibility of intestinal bacteria to bacteriophages inresponse to Ag43 phase variation—a hypothesis," Medical Science Monitor: International Journal of Experimental and Clinical Research, vol. 8, No. 6, pp. HY15-HY18, Jun. 2002.
Weiss et al., "In vivo replication ofT4 and T7 bacteriophages in germ-free mice colonized with*Escherichia coli*," Virology, vol. 393, pp. 16-23, Aug. 2009.
Wine et al., "Adherent-invasive *Escherichia coli*, strain LF82 disrupts apical junctional complexes in polarized epithelia," BMC Microbiology, vol. 9, No. 180, pp. 1-7, Aug. 2009.
Zuber et al., "Genome Analysis of Phage JS98 Defines a Fourth Major Subgroup ofT4-Like Phages in *Escherichia coli*," J. Bacteriol., vol. 189, No. 22, pp. 8206-8214, Nov. 2007.

* cited by examiner

```
                              SEQUENCE LISTING

Sequence total quantity: 45
SEQ ID NO: 1            moltype = AA  length = 368
FEATURE                 Location/Qualifiers
source                  1..368
                        mol_type = protein
                        organism = Bacteriophage wV8
SEQUENCE: 1
MLTNSEKSRF FLADLTGEVQ SIPNTYGYIS NLGLFRSAPI TQTTFLMDLT DWDVSLLDAV    60
DRDSRKAETS APERVRQISF PMMYFKEVES ITPDEIQGVR QPGTANELTT EAVVRAKKLM   120
KIRTKFDITR EFLFMQALKG KVVDARGTLY ADLYKQFDVE KKTVYFDLDN PNADIDAAIE   180
ELRMHMEDEA KTGTVINGEE IHVVVDRLFF SKLVKHPKIR DAYLAQQTPL AWQQITGSLR   240
TGGTDGVQAH MNTFYYGGVK FVQYNGKFKD KRGKVHTLVS IDSVAATVGV GHAFPNVSML   300
GEANNIFEVA YGPCPKMGYA NTLGQELYVF EYEKDRDEGI DFEAHSYMLP YCTRPQLLVD   360
VRSDAKPD                                                           368

SEQ ID NO: 2            moltype = AA  length = 27
FEATURE                 Location/Qualifiers
source                  1..27
                        mol_type = protein
                        note = Peptide from bacteriophage strain P1 aligning with
                         position 10-36  of the major capsid protein of
                         bacteriophage wV8 (SEQ ID NO:
                        organism = synthetic construct
SEQUENCE: 2
FFLADLTGEV QSIPNTYGYI SNLGLFR                                       27

SEQ ID NO: 3            moltype = AA  length = 55
FEATURE                 Location/Qualifiers
source                  1..55
                        mol_type = protein
                        note = Peptide from bacteriophage strain P2 aligning with
                         position 8-62 of the major capsid protein of bacteriophage
                         wV8 (SEQ ID NO: 1)
                        organism = synthetic construct
SEQUENCE: 3
SRFFLADLTG EVQSIPNTYG YISNLGLFRS APITQTTFLM DLTDWDVSLL DAVDR         55

SEQ ID NO: 4            moltype = AA  length = 39
FEATURE                 Location/Qualifiers
source                  1..39
                        mol_type = protein
                        note = Peptide from bacteriophage strain P1-P6 aligning
                         with position 77-115 of the major capsid protein of
                         bacteriophage wV8 (SEQ ID NO: 1)
                        organism = synthetic construct
SEQUENCE: 4
QISFPMMYFK EVESITPDEI QGVRQPGTAN ELTTEAVVR                           39

SEQ ID NO: 5            moltype = AA  length = 16
FEATURE                 Location/Qualifiers
source                  1..16
                        mol_type = protein
                        note = Peptide from bacteriophage strain P1-P6 aligning
                         with position 124-139 of the major capsid protein of
                         bacteriophage wV8 (SEQ ID NO: 1)
                        organism = synthetic construct
SEQUENCE: 5
TKFDITREFL FMQALK                                                   16

SEQ ID NO: 6            moltype = AA  length = 9
FEATURE                 Location/Qualifiers
source                  1..9
                        mol_type = protein
                        note = Peptide from bacteriophage strain P1-P5 aligning
                         with position 147-155 of the major capsid protein of
                         bacteriophage wV8 (SEQ ID NO: 1)
                        organism = synthetic construct
SEQUENCE: 6
GTLYADLYK                                                           9
```

```
SEQ ID NO: 7              moltype = AA   length = 15
FEATURE                   Location/Qualifiers
source                    1..15
                          mol_type = protein
                          note = Peptide from bacteriophage strain P6 aligning with
                           position 147-161 of the major capsid protein of
                           bacteriophage wV8 (SEQ ID NO: 1)
                          organism = synthetic construct
SEQUENCE: 7
GTLYADLYKQ FDVEK                                                          15

SEQ ID NO: 8              moltype = AA   length = 22
FEATURE                   Location/Qualifiers
source                    1..22
                          mol_type = protein
                          note = Peptide from bacteriophage strain P1 aligning with
                           position 162-183 of the major capsid protein of
                           bacteriophage wV8 (SEQ ID NO: 1)
                          organism = synthetic construct
SEQUENCE: 8
KTVYFDLDNP NADIDASIEE LR                                                  22

SEQ ID NO: 9              moltype = AA   length = 21
FEATURE                   Location/Qualifiers
source                    1..21
                          mol_type = protein
                          note = Peptide from bacteriophage strain P3 aligning with
                           position 163-183 of the major capsid protein of
                           bacteriophage wV8 (SEQ ID NO: 1)
                          organism = synthetic construct
SEQUENCE: 9
TVYFDLDNPN ADIDASIEEL R                                                   21

SEQ ID NO: 10             moltype = AA   length = 21
FEATURE                   Location/Qualifiers
source                    1..21
                          mol_type = protein
                          note = Peptide from bacteriophage strain P5-P6 aligning
                           with position 163-183 of the major capsid protein of
                           bacteriophage wV8 (SEQ ID NO: 1)
                          organism = synthetic construct
SEQUENCE: 10
TIYFDLDNPN ADIDASIEEL R                                                   21

SEQ ID NO: 11             moltype = AA   length = 16
FEATURE                   Location/Qualifiers
source                    1..16
                          mol_type = protein
                          note = Peptide from bacteriophage strain P1 and P3-P6
                           aligning with position 192-207 of the major capsid protein
                           of bacteriophage wV8 (SEQ ID NO: 1)
                          organism = synthetic construct
SEQUENCE: 11
TGTVINGEEI HVVVDR                                                         16

SEQ ID NO: 12             moltype = AA   length = 21
FEATURE                   Location/Qualifiers
source                    1..21
                          mol_type = protein
                          note = Peptide from bacteriophage strain P2 aligning with
                           position 192-212 of the major capsid protein of
                           bacteriophage wV8 (SEQ ID NO: 1)
                          organism = synthetic construct
SEQUENCE: 12
TGTVINGEEI HVVVDRLFFS K                                                   21

SEQ ID NO: 13             moltype = AA   length = 22
FEATURE                   Location/Qualifiers
source                    1..22
                          mol_type = protein
                          note = Peptide from bacteriophage strain P1 aligning with
                           position 219-240 of the major capsid protein of
                           bacteriophage wV8 (SEQ ID NO: 1)
                          organism = synthetic construct
SEQUENCE: 13
IRDAYLAQQT PLAWQQITGS LR                                                  22

SEQ ID NO: 14             moltype = AA   length = 49
FEATURE                   Location/Qualifiers
```

```
source                   1..49
                         mol_type = protein
                         note = Peptide from bacteriophage strain P2 aligning with
                          position 219-267 of the major capsid protein of
                          bacteriophage wV8 (SEQ ID NO: 1)
                         organism = synthetic construct
SEQUENCE: 14
IRDAYLAQQT PLAWQQITGS LRTGGTDGVQ AHMNTFYYGG VKFVQYNGK                  49

SEQ ID NO: 15            moltype = AA   length = 20
FEATURE                  Location/Qualifiers
source                   1..20
                         mol_type = protein
                         note = Peptide from bacteriophage strain P3-P4 aligning
                          with position 221-240 of the major capsid protein of
                          bacteriophage wV8 (SEQ ID NO: 1)
                         organism = synthetic construct
SEQUENCE: 15
DAYLAQQTPL AWQQITGSLR                                                  20

SEQ ID NO: 16            moltype = AA   length = 47
FEATURE                  Location/Qualifiers
source                   1..47
                         mol_type = protein
                         note = Peptide from bacteriophage strain P5 aligning with
                          position 221-267 of the major capsid protein of
                          bacteriophage wV8 (SEQ ID NO: 1)
                         organism = synthetic construct
SEQUENCE: 16
DAYLAQQTPL AWQQITGSLR TGGADGVQAH MNTFYYGGVK FVQYNGK                    47

SEQ ID NO: 17            moltype = AA   length = 40
FEATURE                  Location/Qualifiers
source                   1..40
                         mol_type = protein
                         note = Peptide from bacteriophage strain P6 aligning with
                          position 221-260 of the major capsid protein of
                          bacteriophage wV8 (SEQ ID NO: 1)
                         organism = synthetic construct
SEQUENCE: 17
DAYLAQQTPL AWQQITGSLR TGGADGVQAH MNTFYYGGVK                            40

SEQ ID NO: 18            moltype = AA   length = 7
FEATURE                  Location/Qualifiers
source                   1..7
                         mol_type = protein
                         note = Peptide from bacteriophage strain P1, P3 and P4
                          aligning with position 261-267 of the major capsid protein
                          of bacteriophage wV8 (SEQ ID NO: 1)
                         organism = synthetic construct
SEQUENCE: 18
FVQYNGK                                                                7

SEQ ID NO: 19            moltype = AA   length = 20
FEATURE                  Location/Qualifiers
source                   1..20
                         mol_type = protein
                         note = Peptide from bacteriophage strain P1-P2 aligning
                          with position 317-336 of the major capsid protein of
                          bacteriophage wV8 (SEQ ID NO: 1)
                         organism = synthetic construct
SEQUENCE: 19
MGYANTLGQE LYVFEYEKDR                                                  20

SEQ ID NO: 20            moltype = AA   length = 8
FEATURE                  Location/Qualifiers
source                   1..8
                         mol_type = protein
                         note = Peptide from bacteriophage strain P1-P6 aligning
                          with position 355-362 of the major capsid protein of
                          bacteriophage wV8 (SEQ ID NO: 1)
                         organism = synthetic construct
SEQUENCE: 20
PQLLVDVR                                                               8

SEQ ID NO: 21            moltype = AA   length = 522
FEATURE                  Location/Qualifiers
source                   1..522
                         mol_type = protein
```

```
                              organism = Bacteriophage RB69
SEQUENCE: 21
MTTIKTKAQL VDKWKELLEG EGLPEIANSK QAIIAKIFEN QEKDFEVSPE YKDEKIAQAF    60
GSFLTEAEIG GDHGYNAQNI AAGQTSGAVT QIGPAVMGMV RRAIPNLIAF DICGVQPMNS   120
PTGQVFALRA VYGKDPIAAG AKEAFHPMYA PDAMFSGQGA AKKFPALAAS TQTKVGDIYT   180
HFFQETGTVY LQASAQVTIS SSADDAAKLD AEIIKQMEAG ALVEIAEGMA TSIAELQEGF   240
NGSTDNPWNE MGFRIDKQVI EAKSRQLKAA YSIELAQDLR AVHGMDADAE LSGILATEIM   300
LEINREVVDW INYSAQVGKS GMTNIVGSKA GVFDFQDPID IRGARWAGES FKALLFQIDK   360
EAVEIARQTG RGEGNFIIAS RNVVNVLASV DTGISYAAQG LASGFNTDTT KSVFAGVLGG   420
KYRVYIDQYA KQDYFTVGYK GANEMDAGIY YAPYVALTPL RGSDPKNFQP VMGFKTRYGI   480
GVNPFAESSL QAPGARIQSG MPSILNSLGK NAYFRRVYVK GI                      522

SEQ ID NO: 22                 moltype = AA   length = 20
FEATURE                       Location/Qualifiers
REGION                        1..20
                              note = Peptide from bacteriophage strain P8 aligning with
                               position 143-162 of the major capsid protein of
                               bacteriophage RB69 (SEQ ID NO: 21)
source                        1..20
                              mol_type = protein
                              organism = synthetic construct
SEQUENCE: 22
EAFHPMYAPD AMFSGQGAAK                                                20

SEQ ID NO: 23                 moltype = AA   length = 12
FEATURE                       Location/Qualifiers
source                        1..12
                              mol_type = protein
                              note = Peptide from bacteriophage strain P8 aligning with
                               position 269-280 of the major capsid protein of
                               bacteriophage RB69 (SEQ ID NO: 21)
                              organism = synthetic construct
SEQUENCE: 23
AAYSIELAQD LR                                                        12

SEQ ID NO: 24                 moltype = AA   length = 14
FEATURE                       Location/Qualifiers
source                        1..14
                              mol_type = protein
                              note = Peptide from bacteriophage strain P8 aligning with
                               position 306-319 of the major capsid protein of
                               bacteriophage RB69 (SEQ ID NO: 21)
                              organism = synthetic construct
SEQUENCE: 24
EVVDWINYSA QVGK                                                      14

SEQ ID NO: 25                 moltype = AA   length = 13
FEATURE                       Location/Qualifiers
source                        1..13
                              mol_type = protein
                              note = Peptide from bacteriophage strain P8 aligning with
                               position 330-342 of the major capsid protein of
                               bacteriophage RB69 (SEQ ID NO: 21)
                              organism = synthetic construct
SEQUENCE: 25
AGVFDFQDPI DIR                                                       13

SEQ ID NO: 26                 moltype = AA   length = 7
FEATURE                       Location/Qualifiers
source                        1..7
                              mol_type = protein
                              note = Peptide from bacteriophage strain P8 aligning with
                               position 346-352 of the major capsid protein of
                               bacteriophage RB69 (SEQ ID NO: 21)
                              organism = synthetic construct
SEQUENCE: 26
WAGESFK                                                               7

SEQ ID NO: 27                 moltype = AA   length = 14
FEATURE                       Location/Qualifiers
source                        1..14
                              mol_type = protein
                              note = Peptide from bacteriophage strain P8 aligning with
                               position 368-381 of the major capsid protein of
                               bacteriophage RB69 (SEQ ID NO: 21)
                              organism = synthetic construct
SEQUENCE: 27
QTGRGEGNFI IASR                                                      14
```

-continued

```
SEQ ID NO: 28              moltype = AA  length = 50
FEATURE                    Location/Qualifiers
source                     1..50
                           mol_type = protein
                           note = Peptide from bacteriophage strain P8 aligning with
                            position 412-461 of the major capsid protein of
                            bacteriophage RB69 (SEQ ID NO: 21)
                           organism = synthetic construct
SEQUENCE: 28
SVFAGVLGGK YRVYIDQYAK QDYFTVGYKG ANEMDAGIYY APYVALTPLR               50

SEQ ID NO: 29              moltype = AA  length = 44
FEATURE                    Location/Qualifiers
source                     1..44
                           mol_type = protein
                           note = Peptide from bacteriophage strain P8 aligning with
                            position 467-510 of the major capsid protein of
                            bacteriophage RB69 (SEQ ID NO: 21)
                           organism = synthetic construct
SEQUENCE: 29
NFQPVMGFKT RYGIGVNPFA ESSLQAPGAR IQSGMPSILN SLGK                     44

SEQ ID NO: 30              moltype = DNA  length = 18
FEATURE                    Location/Qualifiers
source                     1..18
                           mol_type = other DNA
                           note = All bacteria 16S gene forward primer
                           organism = synthetic construct
SEQUENCE: 30
cggtgaatac gttcccgg                                                  18

SEQ ID NO: 31              moltype = DNA  length = 22
FEATURE                    Location/Qualifiers
source                     1..22
                           mol_type = other DNA
                           note = All bacteria 16S gene reverse primer
                           organism = synthetic construct
SEQUENCE: 31
tacggctacc ttgttacgac tt                                             22

SEQ ID NO: 32              moltype = DNA  length = 20
FEATURE                    Location/Qualifiers
source                     1..20
                           mol_type = other DNA
                           note = E. coli 16S gene forward primer
                           organism = synthetic construct
SEQUENCE: 32
catgccgcgt gtatgaagaa                                                20

SEQ ID NO: 33              moltype = DNA  length = 21
FEATURE                    Location/Qualifiers
source                     1..21
                           mol_type = other DNA
                           note = E. coli 16S gene reverse primer
                           organism = synthetic construct
SEQUENCE: 33
cgggtaacgt caatgagcaa a                                              21

SEQ ID NO: 34              moltype = AA  length = 519
FEATURE                    Location/Qualifiers
source                     1..519
                           mol_type = protein
                           organism = Bacteriophage JS98
SEQUENCE: 34
MKKNALVQKW SALLENEALP EIVGASKQAI IAKIFENQEQ DILTAPEYRD EKISEAFGSF    60
LTEAEIGGDH GYDATNIAAG QTSGAVTQIG PAVMGMVRRA IPHLIAFDIC GVQPLNNPTG   120
QVFALRAVYG KDPIAAGAKE AFHPMYAPNA MFSGQGAAET FEALAASKVL EVGKIYSHFF   180
EATGSAHFQA VEAVTVDAGA TDAAKLDAAV TALVEAGQLA EIAEGMATSI AELQEGFNGS   240
TDNPWNEMGF RIDKQVIEAK SRQLKASYSI ELAQDLRAVH GMDADAELSG ILATEIMLEI   300
NREVIDWINY SAQVGKSGMT NTVGAKAGVF DFQDPIDIRG ARWAGESFKA LLFQIDKEAA   360
EIARQTGRGA GNFIIASRNV VNVLAAVDTS VSYAAQGLGQ GFNVDTTKAV FAGVLGGKYR   420
VYIDQYARSD YFTIGYKGSN EMDAGIYYAP YVALTPLRGS DPKNFQPVMG FKTRYGIGIN   480
PFADPAAQAP TKRIQNGMPD IVNSLGLNGY FRRVYVKGI                          519

SEQ ID NO: 35              moltype = AA  length = 13
FEATURE                    Location/Qualifiers
source                     1..13
                           mol_type = protein
                           note = Peptide from bacteriophage strain CLB_P2 aligning
```

```
                            with position 127-139 of the major capsid protein of
                            bacteriophage JS98 (SEQ ID NO: 34)
                            organism = synthetic construct
SEQUENCE: 35
AVVGKDPIAA GAK                                                              13

SEQ ID NO: 36               moltype = AA   length = 12
FEATURE                     Location/Qualifiers
source                      1..12
                            mol_type = protein
                            note = Peptide from bacteriophage strain CLB_P2 aligning
                            with position 266-277 of the major capsid protein of
                            bacteriophage JS98 (SEQ ID NO: 34)
                            organism = synthetic construct
SEQUENCE: 36
ASYSIELAQD LR                                                               12

SEQ ID NO: 37               moltype = AA   length = 14
FEATURE                     Location/Qualifiers
source                      1..14
                            mol_type = protein
                            note = Peptide from bacteriophage strain CLB_P2 aligning
                            with position 303-316 of the major capsid protein of
                            bacteriophage JS98 (SEQ ID NO: 34)
                            organism = synthetic construct
SEQUENCE: 37
EVIDWINYSA QVGK                                                             14

SEQ ID NO: 38               moltype = AA   length = 13
FEATURE                     Location/Qualifiers
source                      1..13
                            mol_type = protein
                            note = Peptide from bacteriophage strain CLB_P2 aligning
                            with position 327-339 of the major capsid protein of
                            bacteriophage JS98 (SEQ ID NO: 34)
                            organism = synthetic construct
SEQUENCE: 38
AGVFDFQDPI DIR                                                              13

SEQ ID NO: 39               moltype = AA   length = 22
FEATURE                     Location/Qualifiers
source                      1..22
                            mol_type = protein
                            note = Peptide from bacteriophage strain CLB_P2 aligning
                            with position 343-364 of the major capsid protein of
                            bacteriophage JS98 (SEQ ID NO: 34)
                            organism = synthetic construct
SEQUENCE: 39
WAGESFKALL FQIDKEAAEI AR                                                    22

SEQ ID NO: 40               moltype = AA   length = 10
FEATURE                     Location/Qualifiers
source                      1..10
                            mol_type = protein
                            note = Peptide from bacteriophage strain CLB_P2 aligning
                            with position 369-378 of the major capsid protein of
                            bacteriophage JS98 (SEQ ID NO: 34)
                            organism = synthetic construct
SEQUENCE: 40
GAGNFIIASR                                                                  10

SEQ ID NO: 41               moltype = AA   length = 20
FEATURE                     Location/Qualifiers
source                      1..20
                            mol_type = protein
                            note = Peptide from bacteriophage strain CLB_P2 aligning
                            with position 409-428 of the major capsid protein of
                            bacteriophage JS98 (SEQ ID NO: 34)
                            organism = synthetic construct
SEQUENCE: 41
AVFAGVLGGK YRVYIDQYAR                                                       20

SEQ ID NO: 42               moltype = AA   length = 21
FEATURE                     Location/Qualifiers
source                      1..21
                            mol_type = protein
                            note = Peptide from bacteriophage strain CLB_P2 aligning
                            with position 438-458 of the major capsid protein of
                            bacteriophage JS98 (SEQ ID NO: 34)
```

```
                        organism = synthetic construct
SEQUENCE: 42
GSNEMDAGIY YAPYVALTPL R                                            21

SEQ ID NO: 43           moltype = AA  length = 49
FEATURE                 Location/Qualifiers
source                  1..49
                        mol_type = protein
                        note = Peptide from bacteriophage strain CLB_P2 aligning
                          with position 464-512 of the major capsid protein of
                          bacteriophage JS98 (SEQ ID NO: 34)
                        organism = synthetic construct
SEQUENCE: 43
NFQPVMGFKT RYGIGINPFA DPAAQAPTKR IQNGMPDIVN SLGLNGYFR               49

SEQ ID NO: 44           moltype = DNA  length = 21
FEATURE                 Location/Qualifiers
source                  1..21
                        mol_type = other DNA
                        note = forward primer to amplify a specific gene (pMT1)
                          from LF82
                        organism = synthetic construct
SEQUENCE: 44
ccattcatgc agcagctctt t                                            21

SEQ ID NO: 45           moltype = DNA  length = 21
FEATURE                 Location/Qualifiers
source                  1..21
                        mol_type = other DNA
                        note = reverse primer to amplify a specific gene (pMT1)
                          from LF82
                        organism = synthetic construct
SEQUENCE: 45
atcggacaac attagcggtg t                                            21
```

BACTERIOPHAGE THERAPY

CROSS REFERENCE TO RELATED APPLICATIONS

This application is a divisional of U.S. application Ser. No. 17/353,337, filed Jun. 21, 2021, now U.S. Pat. No. 11,918,613, which is a divisional of U.S. application Ser. No. 14/787,581, filed Oct. 28, 2015, now U.S. Pat. No. 11,040,078, which a U.S. National Stage of International Application PCT/EP2014/058840, filed Apr. 30, 2014, and claims priority to European Application No. 13305568.1, filed Apr. 30, 2013.

SEQUENCE LISTING

The instant application contains a Sequence Listing which has been submitted electronically in XML file format and is hereby incorporated by reference in its entirety. Said XML copy, created on Mar. 13, 2024, is named 261854-source.xml and is 53,973 bytes in size.

FIELD OF THE INVENTION

The present invention lies in the field of bacteriophage therapy for use in the treatment of inflammatory bowel diseases.

BACKGROUND

Bacteriophages are viruses that infect bacteria by specific interaction.

Crohn's disease (CD), also known as regional enteritis, is an inflammatory disease of the intestines that may affect any part of the gastrointestinal tract from mouth to anus, causing a wide variety of symptoms. It primarily causes abdominal pain, diarrhea, vomiting, or weight loss, but may also cause complications outside the gastrointestinal tract such as skin rashes, arthritis, inflammation of the eye, tiredness, and lack of concentration.

Although the exact cause of CD is still unknown, a combination of environmental factors and genetic predisposition seems to cause the disease. CD is thought to be an autoimmune disease, in which the body's immune system attacks the gastrointestinal tract, causing inflammation; it is classified as a type of inflammatory bowel disease (IBD).

In patients with CD, abnormal expression of carcinoembryonic antigen-related cell adhesion molecule 6 (CEACAM6) is observed at the apical surface of the ileal epithelium and CD ileal lesions are colonized by pathogenic adherent-invasive *Escherichia coli* (AIEC).

There is no known pharmaceutical or surgical cure for Crohn's disease. In particular, neither IBD in general nor CD in particular can be treated with antibiotics (aiming at combatting pathogenic *E. coli*). Treatment options are restricted to controlling symptoms, maintaining remission, and preventing relapse.

SUMMARY OF THE INVENTION

The subject invention provides a pharmaceutical composition comprising: (i) at least one bacteriophage strain capable of producing a lytic infection in an adherent-invasive *Escherichia coli* strain; and (ii) a pharmaceutically acceptable carrier; for the treatment of inflammatory bowel disease (IBD).

The subject invention further provides a method of treating inflammatory bowel disease comprising administering to a subject in need thereof at least one bacteriophage strain capable of producing a lytic infection in an adherent-invasive *Escherichia coli* strain thereby treating the subject.

The subject invention further provides a bacteriophage strain P1 deposited with the French National Collection of Microorganisms at the Institut Pasteur under Accession Number CNCM I-4694 or a variant thereof, wherein the variant has the same lytic activity, preferably the same lytic activity and the same phenotypic characteristics as said bacteriophage strain.

The subject invention further provides a bacteriophage strain P2 deposited with the French National Collection of Microorganisms at the Institut Pasteur under Accession Number CNCM I-4695 or a variant thereof, wherein the variant has the same lytic activity, preferably the same lytic activity and the same phenotypic characteristics as said bacteriophage strain.

The subject invention further provides a bacteriophage strain P3 deposited with the French National Collection of Microorganisms at the Institut Pasteur under Accession Number CNCM I-4696 or a variant thereof, wherein the variant has the same lytic activity, preferably the same lytic activity and the same phenotypic characteristics as said bacteriophage strain.

The subject invention further provides a bacteriophage strain P4 deposited with the French National Collection of Microorganisms at the Institut Pasteur under Accession Number CNCM I-4697 or a variant thereof, wherein the variant has the same lytic activity, preferably the same lytic activity and the same phenotypic characteristics as said bacteriophage strain.

The subject invention further provides a bacteriophage strain P5 deposited with the French National Collection of Microorganisms at the Institut Pasteur under Accession Number CNCM I-4698 or a variant thereof, wherein the variant has the same lytic activity, preferably the same lytic activity and the same phenotypic characteristics as said bacteriophage strain.

The subject invention further provides a bacteriophage strain P6 deposited with the French National Collection of Microorganisms at the Institut Pasteur under Accession Number CNCM I-4699 or a variant thereof, wherein the variant has the same lytic activity, preferably the same lytic activity and the same phenotypic characteristics as said bacteriophage strain.

The subject invention further provides a bacteriophage strain P8 deposited with the French National Collection of Microorganisms at the Institut Pasteur under Accession Number CNCM I-4700 or a variant thereof, wherein the variant has the same lytic activity, preferably the same lytic activity and the same phenotypic characteristics as said bacteriophage strain.

The subject invention also makes use of bacteriophage strain CLB_P2 deposited with the French National Collection of Microorganisms at the Institut Pasteur under Accession Number CNCM I-4675 or a variant thereof, wherein the variant has the same lytic activity, preferably the same lytic activity and the same phenotypic characteristics as said bacteriophage strain.

For the purpose of the present invention, a variant of a bacteriophage strain is regarded as having the same lytic activity as said bacteriophage strain if it performs at least "+" against at least one of the AIEC strains LF82, 07081, 07082, 07076 and 06075 in the "In vitro assay of the infectivity of bacteriophages in AIEC strains" described in Example 3 below. In a preferred embodiment, a variant is regarded as having the same lytic activity if it performs at least "+" against all five AIEC strains LF 82, LF 06075, LF 07076, LF 07081 and LF 07082 (AIEC strains LF 06075, LF 07076, LF 07081 and LF 07082 are also abbreviated herein as 06075, 07076, 07081 and 07082, respectively). These AIEC strains have been deposited by Université Lille 2—Droit et Santé, 42 Rue Paul Duez, 59000 Lille (France) with the French National Collection at Institut Pasteur under Accession Numbers CNCM I-4712 (LF 82), CNCM I-4713 (LF 06075), CNCM I-4714 (LF 07076), CNCM I-4715 (LF 07081) and CNCM I-4716 (LF 07082).

For the purpose of the present invention, a variant of one of the bacteriophage strains P1 to P6, P8 and CLB_P2 is regarded as having the same phenotypic characteristics as said bacteriophage strain if it has at least 80% sequence identity on at least 70% of length, preferably at least 90% sequence identity on at least 80% of length and more preferably complete sequence identity on at least 90% of length (as determined by the BLAST algorithm) with the major capsid protein of bacteriophage wV8 (for variants of P1 to P6) or bacteriophage RB69 (for variants of P8) or bacteriophage JS98 (for variants of CLB_P2), as described below in the section "Identification of Major Capsid Proteins".

In a preferred embodiment, a variant of a bacteriophage has the same lytic activity as the bacteriophage. In another embodiment, a variant of a bacteriophage has the same lytic activity and the same phenotypic characteristics as the bacteriophage.

DETAILED DESCRIPTION OF THE INVENTION

The subject invention provides a pharmaceutical composition comprising: (i) at least one bacteriophage strain capable of producing a lytic infection in an adherent-invasive *Escherichia coli* strain; and (ii) a pharmaceutically acceptable carrier; for the treatment of inflammatory bowel disease.

The subject invention further provides for a method of treating inflammatory bowel disease comprising administering to a subject in need thereof at least one bacteriophage strain capable of producing a lytic infection in an adherent-invasive *Escherichia coli* strain thereby treating the subject.

An "adherent-invasive *Escherichia coli* (AIEC) strain" as used herein should be understood as referring to an *E. coli* strain having a mean invasion potential of equal to or higher than 0.1% in a cell culture of the intestinal cell line I-407. In other words, an AIEC strain has the ability to invade an intestinal cell culture of I-407 with an invasion index equal or superior to 0.1% of the original inoculum (taken as 100%), when tested in accordance with the invasion assay described below in the section "Invasion Assay" (see also Darfeuille-Michaud et al. (2004), *Gastroenterology* 127: 412-421).

Non-limiting examples of AIEC strains are LF82, LF82SK (deposited by Université d'Auvergne, 49 Boulevard François Mitterand, 63001 Clermont-Ferrand (France) with the French National Collection at Institut Pasteur under Accession Number CNCM I-4723), those listed in Table 1 herein below and those listed in the following itemization (cf. Darfeuille-Michaud et al. (2004), *Gastroenterology* 127: 412-421, especially page 417, Table 2): LF31, LF71, LF123, LF138, LF9, LF15, LF28, LF50, LF65, LF119, LF128, LF130, LF73, LF100, LF110, LF134, LF105, LF49-2, LB11, and LF45-2. In one embodiment, the adherent-invasive *Escherichia coli* strain is LF82, 07081, 07082, 07076 or 06075, in particular LF82.

In one embodiment, the adherent-invasive *Escherichia coli* strain is present in the colon of the subject. In another embodiment, the adherent-invasive *Escherichia coli* strain is present in the ileum of the subject. In yet another embodiment, the adherent-invasive *Escherichia coli* strain is present in one or more intestinal parts (small and/or large) of the subject.

In one embodiment, the at least one bacteriophage strain is P1 deposited with the French National Collection of Microorganisms at the Institut Pasteur under Accession Number CNCM I-4694 or a variant thereof, wherein the variant has the same lytic activity, preferably the same lytic activity and the same phenotypic characteristics as said bacteriophage strain.

In one embodiment, the at least one bacteriophage strain is P2 deposited with the French National Collection of Microorganisms at the Institut Pasteur under Accession Number CNCM I-4695 or a variant thereof, wherein the variant has the same lytic activity, preferably the same lytic activity and the same phenotypic characteristics as said bacteriophage strain.

In one embodiment, the at least one bacteriophage strain is P3 deposited with the French National Collection of Microorganisms at the Institut Pasteur under Accession Number CNCM I-4696 or a variant thereof, wherein the variant has the same lytic activity, preferably the same lytic activity and the same phenotypic characteristics as said bacteriophage strain.

In one embodiment, the at least one bacteriophage strain is P4 deposited with the French National Collection of Microorganisms at the Institut Pasteur under Accession Number CNCM I-4697 or a variant thereof, wherein the variant has the same lytic activity, preferably the same lytic activity and the same phenotypic characteristics as said bacteriophage strain.

In one embodiment, the at least one bacteriophage strain is P5 deposited with the French National Collection of Microorganisms at the Institut Pasteur under Accession Number CNCM I-4698 or a variant thereof, wherein the variant has the same lytic activity, preferably the same lytic activity and the same phenotypic characteristics as said bacteriophage strain.

In one embodiment, the at least one bacteriophage strain is P6 deposited with the French National Collection of Microorganisms at the Institut Pasteur under Accession Number CNCM I-4699 or a variant thereof, wherein the variant has the same lytic activity, preferably the same lytic activity and the same phenotypic characteristics as said bacteriophage strain.

In one embodiment, the at least one bacteriophage strain is P8 deposited with the French National Collection of Microorganisms at the Institut Pasteur under Accession Number CNCM I-4700 or a variant thereof, wherein the variant has the same lytic activity, preferably the same lytic activity and the same phenotypic characteristics as said bacteriophage strain.

In one embodiment, the at least one bacteriophage strain is CLB_P2 deposited with the French National Collection of Microorganisms at the Institut Pasteur under Accession Number CNCM I-4675 or a variant thereof, wherein the variant has the same lytic activity, preferably the same lytic activity and the same phenotypic characteristics as said bacteriophage strain.

In one aspect, it is envisaged that the pharmaceutical composition comprises more than one bacteriophage strain, also named "a bacteriophage cocktail". The bacteriophage cocktail of the present invention comprises any combination of two or more of P1, P2, P3, P4, P5, P6, P8 and CLB_P2 and variants thereof having the same lytic activity, preferably the same lytic activity and the same phenotypic characteristics. Preferably, the bacteriophages in a bacteriophage cocktail intended for treatment of a specific subject or group of subjects will be selected on the basis of the AIEC strain or AIEC strains identified and selected for combatting.

Non-limiting examples of inflammatory bowel diseases are Crohn's disease (CD), ulcerative colitis (UC), chronic inflammatory bowel disease (chronic IBD) such as but not limited to microscopic colitis, celiac disease and vasculitis. In one embodiment, the IBD is CD or UC. In another embodiment, the inflammatory bowel disease is recurrence of ileal lesions after surgery (such as surgery for the removal of at least a part of the small intestine in CD patients). The recurrence can be measured by the Rutgeerts score.

In one embodiment, the IBD is not caused by a bacterial infection. This embodiment is based on the observation that IBD is an autoimmune disease which is not generally considered a bacterial disease. Instead, a bacterial infection may be concomitant to IBD, but is not necessarily the causative agent. This observation adds to the surprising finding of the present invention, namely applying bacteriophage therapy for the treatment of a disease which is not caused by bacteria.

For that reason, there can be—as an example—AIEC strains in family members of subjects suffering from an IBD, although these family members do not suffer from this disease. Likewise, AIEC strains can also be found in subjects neither suffering from IBD nor being related to subjects suffering from IBD, as can also be seen from Table 1 below.

"Treating" as used herein should be understood to encompass a decrease in one or more symptoms characteristic of the disease; a decrease in the rate of progression of the disease; recovery from the disease, cure from the disease, maintenance of remission and prophylaxis such as prevention of relapse.

A "subject" as used herein can be a male or a female subject. A subject can be a human being or any other mammal.

The dose and regimen of administration of a pharmaceutical composition of the invention will necessarily be dependent upon the therapeutic effect to be achieved (e.g. treatment of IBD) and may vary with the particular bacteriophage strains in the composition, the route of administration, and the age and condition of the individual subject to whom the medicament is to be administered.

A dosage for humans is likely to contain a dose of bacteriophage between $10^4$ and $10^{11}$ plaque forming units (pfu). The desired dose may be presented as one dose per day or as multiple sub-doses administered at appropriate intervals.

In the context of the present invention the term "pharmaceutically acceptable carrier" relates to pharmaceutically-acceptable, non-toxic carriers, fillers or diluents, which are defined as vehicles commonly used to formulate pharmaceutical compositions for animal or human administration.

The pharmaceutical compositions of the present invention may further comprise pharmaceutically acceptable auxiliary agents, and optionally other therapeutic agents. Auxiliary agents, also named accessory ingredients, encompass those conventional in the art such as, but not limited to matrix-forming agents, thickeners, binders, lubricants, pH adjusting agents, protecting agents, viscosity enhancers, wicking agents, disintegrants, including non-effervescent and effervescent disintegrants, surfactants, anti-oxidants, wetting agents, colorants, flavoring agents, taste-masking agents, sweeteners, preservatives and so forth. In addition to being pharmaceutically acceptable, the auxiliary agents must be "acceptable" in the sense that they are compatible with the other ingredients of the composition, including the bacteriophage.

Pharmaceutical compositions and routes of administration include those suitable for or via oral (including buccal, sublingual and intraorbital), rectal, nasal, topical (including transdermal), ocular, otic, vaginal, bronchial, pulmonary or parenteral (including subcutaneous, intramuscular, intravenous, intradermal, intraperitoneal, intrapleural, intravesicular and intrathecal) administration or administration via an implant. The pharmaceutical composition or route of administration may be adapted to provide a targeted effect of bacteriophage strain of the invention. In a specific embodiment, a pharmaceutical composition of the invention is administered orally. The compositions may be prepared by any method well known in the art of pharmacy. Such methods include the step of bringing in association a bacteriophage strain of the invention with a pharmaceutically acceptable carrier and optionally one or more auxiliary agents.

Pharmaceutical compositions suitable for oral administration may be presented as discrete dosage units (dosage forms) such as pills, tablets, dragees or capsules, or as a powder or granules, or as a solution or suspension. The pharmaceutical composition may also be presented as a bolus or paste. The compositions can further be processed into a suppository or enema for rectal administration.

For parenteral administration, suitable compositions include aqueous and non-aqueous sterile injections. The compositions may be presented in unit-dose or multi-dose containers, for example sealed vials and ampoules, and may be stored in a freeze-dried (lyophilized) condition requiring only the addition of sterile liquid carrier, for example water, prior to use.

For transdermal administration, e.g., gels, patches or sprays can be contemplated.

Compositions or formulations suitable for pulmonary administration, e.g., by nasal inhalation, include fine dusts or mists which may be generated by means of metered dose pressurized aerosols, nebulizers or insufflators.

The invention further includes a kit comprising a pharmaceutical composition of the invention and instructions for the use of the composition for a use as hereinbefore described, optionally together with packaging material.

The subject invention further provides a bacteriophage strain P1 deposited with the French National Collection of Microorganisms at the Institut Pasteur under Accession Number CNCM I-4694 or a variant thereof, wherein the variant has the same lytic activity, preferably the same lytic activity and the same phenotypic characteristics as said bacteriophage strain.

The subject invention further provides a bacteriophage strain P2 deposited with the French National Collection of Microorganisms at the Institut Pasteur under Accession Number CNCM I-4695 or a variant thereof, wherein the variant has the same lytic activity, preferably the same lytic activity and the same phenotypic characteristics as said bacteriophage strain.

The subject invention further provides a bacteriophage strain P3 deposited with the French National Collection of Microorganisms at the Institut Pasteur under Accession Number CNCM I-4696 or a variant thereof, wherein the variant has the same lytic activity, preferably the same lytic activity and the same phenotypic characteristics as said bacteriophage strain.

The subject invention further provides a bacteriophage strain P4 deposited with the French National Collection of Microorganisms at the Institut Pasteur under Accession Number CNCM I-4697 or a variant thereof, wherein the variant has the same lytic activity, preferably the same lytic activity and the same phenotypic characteristics as said bacteriophage strain.

The subject invention further provides a bacteriophage strain P5 deposited with the French National Collection of Microorganisms at the Institut Pasteur under Accession Number CNCM I-4698 or a variant thereof, wherein the variant has the same lytic activity, preferably the same lytic activity and the same phenotypic characteristics as said bacteriophage strain.

The subject invention further provides a bacteriophage strain P6 deposited with the French National Collection of Microorganisms at the Institut Pasteur under Accession Number CNCM I-4699 or a variant thereof, wherein the variant has the same lytic activity, preferably the same lytic activity and the same phenotypic characteristics as said bacteriophage strain.

The subject invention further provides a bacteriophage strain P8 deposited with the French National Collection of Microorganisms at the Institut Pasteur under Accession Number CNCM I-4700 or a variant thereof, wherein the variant has the same lytic activity, preferably the same lytic activity and the same phenotypic characteristics as said bacteriophage strain.

EXAMPLES

The invention is further described in the following examples, which are not in any way intended to limit the scope of the invention as claimed.

Methods

Invasion Assay

The Intestine-407 (I-407) cell line derived from human embryonic jejunum and ileum was used as a model of undifferentiated intestinal epithelial cells. It was purchased from Flow Laboratories (Flow Laboratories Inc., Mc Lean, VA).

Intestine-407 cells were seeded in 24-well tissue culture plates (Polylabo, Strasbourg, France) at a density of 4,105 cells/well and incubated for 20 hours. The cell monolayers were washed twice with PBS (pH 7.2). Bacterial invasion of epithelial cells was measured using the gentamicin protection assay (Falkow et al. (1987), Rev. Infect. Dis. 9 (Suppl. 5): S450-455). Each monolayer was inoculated in 1 mL of the cell culture medium lacking antibiotics with a multiplicity of infection of 10 bacteria per epithelial cell. After a 3-hour incubation period at 37° C. with 5% $CO_2$, the monolayers were washed 3 times with PBS. Fresh cell culture medium containing 100 µg/mL of gentamicin (Sigma, St. Louis, MO) was added for 1 hour to kill extracellular bacteria before lysis of the monolayers with 1% Triton X-100 (Sigma) in deionized water. This concentration of Triton X-100 had no effect on bacterial viability for at least 30 minutes. The samples were diluted and plated onto Mueller-Hinton agar plates to determine the number of colony-forming units. All results of *E. coli* invasive ability with Intestine-407 cell line were expressed as the percentage of intracellular bacteria compared with the initial inoculum, taken as 100%. All of the assays were performed at least 3 times in separate experiments.

Identification of Major Capsid Proteins

Virion proteins were obtained by boiling 60 µl of a suspension of $10^{11}$ pfu/ml of each bacteriophage for 10 min. 20 µl of the suspension were run on a precast 4-12% polyacrylamide gel. The gel was stained with Coomassie blue and the major bands were excised, subjected to trypsin digestion and analyzed by mass spectrometry at the Institut Pasteur microsequencing facility.

The peptide masses obtained were compared with the information in protein databases, allowing the identification of the closest known protein, i.e. wV8 for P1 to P6 and RB69 for P8 and JS98 for CLB_P2 (see A. Villegas et al, Virology Journal 2009, 6:41 for characterization of wV8 and S. Zuber et al., Journal of Bacteriology 2007, 189:22, 8206 for characterization of RB69 and JS 98).

Alignment of the major capsid protein of bacteriophage wV8 with peptides obtained from mass spectrometry of the major capsid proteins of bacteriophages P1 to P6:

```
wV8: MLTNSEKSRFFLADLTGEVQSIPNTYGYISNLGLFRSAPITQTTFLMDLTDWDVSLLDAVDRDSRKAE
P1:            FFLADLTGEVQSIPNTYGYISNLGLFR (SEQ ID NO: 2)
P2:  SRFFLADLTGEVQSIPNTYGYISNLGLFRSAPITQTTFLMDLTDWDVSLLDAVDR (SEQ ID NO: 3)
P3:
P4:
P5:
P6:

wV8: TSAPERVRQISFPMMYFKEVESITPDEIQGVRQPGTANELTTEAVVRAKKLMKIRTKFDITREFLFMQ
P1:           QISFPMMYFKEVESITPDEIQGVRQPGTANELTTEAVVR         TKFDITREFLFMQ
              (SEQ ID NO: 4)                                  (SEQ ID NO: 5)
P2:           QISFPMMYFKEVESITPDEIQGVRQPGTANELTTEAVVR         TKFDITREFLFMQ
              (SEQ ID NO: 4)                                  (SEQ ID NO: 5)
P3:           QISFPMMYFKEVESITPDEIQGVRQPGTANELTTEAVVR         TKFDITREFLFMQ
              (SEQ ID NO: 4)                                  (SEQ ID NO: 5)
P4:           QISFPMMYFKEVESITPDEIQGVRQPGTANELTTEAVVR         TKFDITREFLFMQ
              (SEQ ID NO: 4)                                  (SEQ ID NO: 5)
P5:           QISFPMMYFKEVESITPDEIQGVRQPGTANELTTEAVVR         TKFDITREFLFMQ
              (SEQ ID NO: 4)                                  (SEQ ID NO: 5)
P6:           QISFPMMYFKEVESITPDEIQGVRQPGTANELTTEAVVR         TKFDITREFLFMQ
              (SEQ ID NO: 4)                                  (SEQ ID NO: 5)
```

```
wV8: ALKGKVVDARGTLYADLYKQFDVEKKTVYFDLDNPNADIDAAIEELRMHMEDEAKTGTVINGEEIHVV
P1:  ALK         GTLYADLYK        KTVYFDLDNPNADIDASIEELR         TGTVINGEEIHVV
                 (SEQ ID NO: 6)   (SEQ ID NO: 8)                 (SEQ ID NO: 11)
P2:  ALK         GTLYADLYK                                       TGTVINGEEIHVV
                 (SEQ ID NO: 6)                                  (SEQ ID NO: 12)
P3:  ALK         GTLYADLYK        TVYFDLDNPNADIDASIEELR          TGTVINGEEIHVV
                 (SEQ ID NO: 6)   (SEQ ID NO: 9)                 (SEQ ID NO: 11)
P4:  ALK         GTLYADLYK                                       TGTVINGEEIHVV
                 (SEQ ID NO: 6)                                  (SEQ ID NO: 11)
P5:  ALK         GTLYADLYK        TIYFDLDNPNADIDASIEELR          TGTVINGEEIHVV
                 (SEQ ID NO: 6)   (SEQ ID NO: 10)                (SEQ ID NO: 11)
P6:  ALK         GTLYADLYKQFDVEK  TIYFDLDNPNADIDASIEELR          TGTVINGEEIHVV
                 (SEQ ID NO: 7)   (SEQ ID NO: 10)                (SEQ ID NO: 11)

wV8: VDRLFFSKLVKHPKIRDAYLAQQTPLAWQQITGSLRTGGTDGVQAHMNTFYYGGVKFVQYNGKFKDKR
P1:  VDR          IRDAYLAQQTPLAWQQITGSLR                       FVQYNGK
                  (SEQ ID NO: 13)                              (SEQ ID NO: 18)
P2:  VDRLFFSK     IRDAYLAQQTPLAWQQITGSLRTGGTDGVQAHMNTFYYGGVKFVQYNGK
                  (SEQ ID NO: 14)
P3:  VDR             DAYLAQQTPLAWQQITGSLR                      FVQYNGK
                     (SEQ ID NO: 15)                           (SEQ ID NO: 18)
P4:  VDR             DAYLAQQTPLAWQQITGSLR                      FVQYNGK
                     (SEQ ID NO: 15)                           (SEQ ID NO: 18)
P5:  VDR             DAYLAQQTPLAWQQITGSLRTGGADGVQAHMNTFYYGGVKFVQYNGK
                     (SEQ ID NO: 16)
P6:                  DAYLAQQTPLAWQQITGSLRTGGADGVQAHMNTFYYGGVK
                     (SEQ ID NO: 17)

wV8: GKVHTLVSIDSVAATVGVGHAFPNVSMLGEANNIFEVAYGPCPKMGYANTLGQELYVFEYEKDRDEGI
P1:                                           MGYANTLGQELYVFEYEKDR
                                              (SEQ ID NO: 19)
P2:                                           MGYANTLGQELYVFEYEKDR
                                              (SEQ ID NO: 19)
P3:
P4:
P5:
P6:

wV8: DFEAHSYMLPYCTRPQLLVDVRSDAKPD (SEQ ID NO: 1)
P1:              PQLLVDVR (SEQ ID NO: 20)
P2:              PQLLVDVR (SEQ ID NO: 20)
P3:              PQLLVDVR (SEQ ID NO: 20)
P4:              PQLLVDVR (SEQ ID NO: 20)
P5:              PQLLVDVR (SEQ ID NO: 20)
P6:              PQLLVDVR (SEQ ID NO: 20)
```

Alignment of the major capsid protein of bacteriophage RB69 with peptides obtained from mass spectrometry of the major capsid protein of bacteriophage P8:

```
RB69: MTTIKTKAQLVDKWKELLEGEGLPEIANSKQAIIAKIFENQEKDFEVSPEYKDEKIAQAFGSFLTEAE
P8:

RB69: IGGDHGYNAQNIAAGQTSGAVTQIGPAVMGMVRRAIPNLIAFDICGVQPMNSPTGQVFALRAVYGKDP
P8:

RB69: IAAGAKEAFHPMYAPDAMFSGQGAAKKFPALAASTQTKVGDIYTHFFQETGTVYLQASAQVTISSSAD
P8:         EAFHPMYAPDAMFSGQGAAK
            (SEQ ID NO: 22)

RB69: DAAKLDAEIIKQMEAGALVEIAEGMATSIAELQEGFNGSTDNPWNEMGFRIDKQVIEAKSRQLKAAYS
P8:                                                                    AAYS

RB69: IELAQDLRAVHGMDADAELSGILATEIMLEINREVVDWINYSAQVGKSGMTNIVGSKAGVFDFQDPID
P8:   IELAQDLR                      EVVDWINYSAQVGK              AGVFDFQDPID
      (SEQ ID NO: 23)               (SEQ ID NO: 24)             (SEQ ID NO: 25)
```

```
RB69:   IRGARWAGESFKALLFQIDKEAVEIARQTGRGEGNFIIASRNVVNVLASVDTGISYAAQGLASGFNTD
P8:     IR   WAGESFK              QTGRGEGNFIIASR
             (SEQ ID NO: 26)       (SEQ ID NO: 27)

RB69:   TTKSVFAGVLGGKYRVYIDQYAKQDYFTVGYKGANEMDAGIYYAPYVALTPLRGSDPKNFQPVMGFKT
P8:         SVFAGVLGGKYRVYIDQYAKQDYFTVGYKGANEMDAGIYYAPYVALTPLR   NFQPVMGFKT
            (SEQ ID NO: 28)                                        (SEQ ID NO: 29)

RB69:   RYGIGVNPFAESSLQAPGARIQSGMPSILNSLGKNAYFRRVYVKGI (SEQ ID NO: 21)
P8:     RYGIGVNPFAESSLQAPGARIQSGMPSILNSLGK
```

Alignment of the major capsid protein of bacteriophage JS98 with peptides obtained from mass spectrometry of the major capsid protein of bacteriophage CLB_P2.

```
JS98:    MKKNALVQKWSALLENEALPEIVGASKQAIIAKIFENQEQDILTAPEYRDEKISEAFGSFLTEAEI
CLB_P2:

JS98:    GGDHGYDATNIAAGQTSGAVTQIGPAVMGMVRRAIPHLIAFDICGVQPLNNPTGQVFALRAVYGKD
CLB_P2:                                                                AVYGKD
                                                                       (SEQ ID NO: 35)

JS98:    PIAAGAKEAFHPMYAPNAMFSGQGAAETFEALAASKVLEVGKIYSHFFEATGSAHFQAVEAVTVDA
CLB_P2:  PIAAGAK

JS98:    GATDAAKLDAAVTALVEAGQLAEIAEGMATSIAELQEGFNGSTDNPWNEMGFRIDKQVIEAKSRQL
CLB_P2:

JS98:    KASYSIELAQDLRAVHGMDADAELSGILATEIMLEINREVIDWINYSAQVGKSGMTNTVGAKAGVF
CLB_P2:  ASYSIELAQDLR              EVIDWINYSAQVGK            AGVF
         (SEQ ID NO: 36)           (SEQ ID NO: 37) (SEQ ID NO: 38)

JS98:    DFQDPIDIRGARWAGESFKALLFQIDKEAAEIARQTGRGAGNFIIASRNVVNVLAAVDTSVSYAAQ
CLB_P2:  DFQDPIDIR   WAGESFKALLFQIDKEAAEIAR    GAGNFIIASR
                     (SEQ ID NO: 39)          (SEQ ID NO: 40)

JS98:    GLGQGFNVDTTKAVFAGVLGGKYRVYIDQYARSDYFTIGYKGSNEMDAGIYYAPYVALTPLRGSDP
CLB_P2:              AVFAGVLGGKYRVYIDQYAR     GSNEMDAGIYYAPYVALTPLR
                     (SEQ ID NO: 41)          (SEQ ID NO: 42)

JS98:    KNFQPVMGFKTRYGIGINPFADPAAQAPTKRIQNGMPDIVNSLGLNGYFRRVYVKGI (SEQ ID NO: 34)
CLB_P2:  NFQPVMGFKTRYGIGINPFADPAAQAPTKRIQNGMPDIVNSLGLNGYFR
         (SEQ ID NO: 43)
```

Example 1

Isolation of AIEC Strains

One hundred and sixty-six (166) adherent-invasive *Escherichia coli* (*E. coli*) strains, including *E. coli* strain LF82 (Table 1), were isolated as follows: The AIEC strains were isolated from fresh feces of CD patients, their family members and control subjects. The feces were diluted in tenfold dilutions up to −9. Each dilution was plated on different media. After incubation, colonies were sub-cultured, identified and the strains were tested for invasion capacity.

In detail, immediately after emission, fresh feces were introduced in a sterile container. The atmosphere was rendered anaerobic by addition of a moistened Anaerocult®. Samples were treated the day of sampling. About 1 g of feces were introduced in 9 mL of cysteinated ¼ strength Ringer solution in pre-weighed tubes; they were reweighed after introduction of the sample to determine its exact weight (first tenfold dilution). Eight further tenfold dilutions were made and 0.1 mL of each dilution was plated on different non-selective and selective media incubated in appropriated conditions: Columbia blood agar (CS) and CSH agar incubated for one week under anaerobic conditions, MRS medium incubated for 48 h in an atmosphere enriched in $CO_2$, McConkey and Cetrimide agar incubated for 48 h in air. All incubations were done at 37° C. After incubation, colonies were counted, subcultured and identified by established phenotypic criteria.

A control subject was selected vis-à-vis a CD patient so that the control subject was of the same sex and age as the CD patient and had a similar family size as the CD patient (to take microflora variation within a family into consideration).

The protocol was approved by the local ethical committee in 2000. The patients were followed by the EPIMAD register, which is organized under an agreement between the Institut National de la Santé et de la Recherche Médicale (INSERM) and the Institut National de Veille Sanitaire (InVS) and is also supported by the François Aupetit Association, Lion's Club of Northwestern France, Ferring Laboratories, the Société Nationale Française de Gastroentérologie and Lille University Hospital.

TABLE 1

| | | Invasion I-407 Mean (%) | Invasion I-407 SEM (%) | Culture Medium [1] | Dilution | Level of E. coli (log UFC/g) [2] | Total Count (logUFC/g) [3] |
|---|---|---|---|---|---|---|---|
| Number | Reference | | | | | | |
| | LF82 | 1.29 | 0.8 | McC | −4 | 5.7 | 5.9 |
| | | | AIEC isolated from CD patient | | | | |
| 06259 | C4-1 | 2.050 | 0.500 | McC | −5 | 5.87 | 10.52 |
| 06254 | C34-12 | 2.163 | 0.738 | Cet | −2 | 2.91 | 10.14 |
| 06256 | C34-2 | 0.550 | 0.170 | McC | −7 | 7.91 | 10.14 |
| 06072 | C39-1 | 0.2075 | 0.147 | McC | −6 | 7.02 | 9.93 |
| 06073 | C39-2 | 0.1374 | 0.097 | McC | −6 | 7.02 | 9.93 |
| 06075 | C39-4 | 0.2334 | 0.165 | McC | −5 | 6.02 | 9.93 |
| 06076 | C39-7 | 0.5900 | 0.417 | Cet | −2 | 3.02 | 9.93 |
| 06087 | C42-1 | 0.1095 | 0.055 | McC | −5 | 5.82 | 9.58 |
| 06088 | C42-2 | 0.1954 | 0.098 | McC | −5 | 5.82 | 9.58 |
| 06089 | C42-3 | 0.1930 | 0.097 | Cet | −3 | 3.82 | 9.58 |
| 06398 | C76-10 | 0.131 | 0.036 | CS ana | −5 | 6.09 | 9.99 |
| 06011 | C84-2 | 0.2580 | 0.129 | McC | −6 | 6.96 | 9.23 |
| 06023 | C97-1 | 0.1173 | 0.068 | McC | −7 | 8.14 | 10.03 |
| 06024 | C97-2 | 0.1303 | 0.075 | McC | −6 | 7.14 | 10.03 |
| 06026 | C98-1 | 0.1439 | 0.072 | McC | −6 | 7.2 | 9.34 |
| 06027 | C98-2 | 0.1122 | 0.065 | McC | −6 | 7.2 | 9.34 |
| 06028 | C98-4 | 0.2310 | 0.133 | Cet | −2 | 3.20 | 9.34 |
| 06029 | C99-1 | 1.0657 | 0.615 | McC | −6 | 6.99 | 10.17 |
| 06030 | C99-2 | 0.1613 | 0.081 | McC | −6 | 6.99 | 10.17 |
| 06031 | C99-3 | 0.2330 | 0.135 | McC | −5 | 5.99 | 10.17 |
| 06033 | C99-9 | 0.4667 | 0.269 | Cet | −2 | 2.99 | 10.17 |
| 06150 | C187-13 | 0.6675 | 0.472 | CS ana | −7 | 7.93 | 9.97 |
| 06151 | C187-14 | 1.0350 | 0.732 | CS ana | −7 | 7.93 | 9.97 |
| 06152 | C187-15 | 0.4375 | 0.253 | CS ana | −7 | 7.93 | 9.97 |
| 06166 | C190-1 | 0.2251 | 0.130 | McC | −8 | 9.28 | 10.98 |
| 06167 | C190-2 | 0.1247 | 0.072 | McC | −8 | 9.28 | 10.98 |
| 06168 | C190-3 | 0.1688 | 0.097 | McC | −7 | 8.28 | 10.98 |
| 06169 | C190-4 | 0.1373 | 0.079 | McC | −6 | 7.28 | 10.98 |
| 06170 | C190-6 | 0.7065 | 0.408 | Cet | −3 | 4.28 | 10.98 |
| 06171 | C190-8 | 0.5827 | 0.336 | Cet | −2 | 3.28 | 10.98 |
| 06172 | C190-7 | 0.5385 | 0.311 | Cet | −2 | 3.28 | 10.98 |
| 06173 | C190-12 | 0.5182 | 0.299 | CS ana | −9 | 10.28 | 10.98 |
| 06280 | C203-7 | 0.185 | 0.087 | Cet | −3 | 3.96 | 9.94 |
| 06281 | C203-9 | 0.393 | 0.023 | Cet | −2 | 2.96 | 9.94 |
| 06283 | C204-4 | 0.253 | 0.092 | McC | −6 | 7.00 | 9.78 |
| 06271 | C205-2 | 0.153 | 0.052 | McC | −6 | 6.93 | 9.97 |
| 06278 | C205-9 | 0.160 | 0.005 | Cet | −2 | 2.93 | 9.97 |
| 06351 | C215-8 | 0.548 | 0.397 | Cet | −5 | 5.93 | 9.91 |
| 06352 | C215-9 | 0.262 | 0.143 | Cet | −5 | 5.93 | 9.91 |
| 06353 | C215-12 | 1.960 | 1.340 | Cet | −3 | 3.93 | 9.91 |
| 06354 | C215-13 | 1.339 | 1.281 | Cet | −3 | 3.93 | 9.91 |
| 06356 | C215-10 | 2.260 | 1.540 | Cet | −3 | 3.93 | 9.91 |
| 06357 | C215-11 | 2.195 | 1.355 | Cet | −3 | 3.93 | 9.91 |
| 06358 | C215-1 | 1.110 | 0.590 | McC | −6 | 7.93 | 9.91 |
| 06359 | C215-2 | 1.523 | 0.928 | McC | −6 | 7.93 | 9.91 |
| 06360 | C215-3 | 0.165 | 0.064 | McC | −4 | 4.93 | 9.91 |
| 06361 | C215-4 | 0.315 | 0.135 | McC | −3 | 3.93 | 9.91 |
| 06362 | C215-5 | 0.980 | 0.720 | McC | −3 | 3.93 | 9.91 |
| 07074 | C43-1 | 1.5825 | 1.3675 | McC | −6 | 7.26 | 9.66 |
| 07075 | C44-1 | 0.1822 | 0.0755 | McC | −5 | 6.01 | 9.91 |
| 07076 | C44-2 | 0.5950 | 0.3350 | McC | −5 | 6.01 | 9.91 |
| 07077 | C44-3 | 0.1432 | 0.0486 | McC | −4 | 5.01 | 9.91 |
| 07078 | C44-4 | 0.3086 | 0.1764 | McC | −4 | 5.01 | 9.91 |
| 07081 | C44-9 | 0.5525 | 0.2675 | Cet | −2 | 3.01 | 9.91 |
| 07082 | C45-1 | 0.4675 | 0.0925 | McC | −5 | 5.94 | 9.46 |
| 07086 | C45-9 | 0.2110 | 0.0842 | Cet | −2 | 2.94 | 9.46 |
| 07093 | C50-2 | 1.3125 | 0.9375 | McC | −5 | 5.99 | 7.69 |
| 07035 | C66-2 | 0.6475 | 0.3125 | McC | −7 | 8.01 | 9.53 |
| 07045 | C71-1 | 0.2079 | 0.1226 | McC | −5 | 5.95 | 10.58 |
| 07046 | C71-2 | 0.2030 | 0.0719 | McC | −4 | 4.95 | 10.58 |
| 07048 | C71-5 | 0.2388 | 0.1382 | Cet | −2 | 2.95 | 10.58 |
| 07051 | C100-11A | 0.6325 | 0.3425 | MRS | −4 | 5.07 | 10.47 |
| 07003 | C112-4 | 0.2513 | 0.0861 | McC | −5 | 6.14 | 10.88 |
| 07006 | C112-10 | 0.8913 | 0.1863 | Cet | −2 | 3.14 | 10.88 |
| 07022 | C121-8 | 0.1903 | 0.0448 | Cet | −5 | 6.14 | 10.88 |
| 07101 | C55-1 | 0.678 | 0.022 | McC | −6 | 6.95 | 10.38 |
| 07103 | C55-3 | 9.175 | 2.775 | McC | −5 | 5.95 | 10.38 |
| 07107 | C55-8A | 4.425 | 0.075 | Cet | −2 | 2.95 | 10.38 |
| 07111 | C60-1 | 0.232 | 0.028 | McC | −6 | 6.84 | 8.20 |
| 07113 | C60-3 | 0.340 | 0.105 | McC | −4 | 4.84 | 8.20 |
| 07126 | C231-1 | 0.323 | 0.097 | McC | −7 | 7.94 | 10.62 |

TABLE 1-continued

| | | AIEC strains | | | | |
|---|---|---|---|---|---|---|
| Number | Reference | Invasion I-407 Mean (%) | Invasion I-407 SEM (%) | Culture Medium [1] | Dilution | Level of E. coli (log UFC/g) [2] | Total Count (logUFC/g) [3] |
| 07127 | C231-2 | 0.141 | 0.030 | McC | −6 | 6.94 | 10.62 |
| 07128 | C231-5 | 0.365 | 0.095 | Cet | −3 | 3.94 | 10.62 |
| 07134 | C233-1 | 0.645 | 0.090 | McC | −3 | 3.98 | 6.18 |
| 07135 | C233-3 | 1.510 | 0.390 | McC | −2 | 2.98 | 6.18 |
| 07136 | C233-2 | 2.090 | 0.260 | McC | −3 | 3.98 | 6.18 |
| 07137 | C233-11 | 1.108 | 0.168 | CSH | −3 | 3.98 | 6.18 |
| | | AIEC isolated from family members of CD patients | | | | |
| 06066 | C22-9 | 0.2710 | 0.192 | CS ana | −7 | 7.94 | 10.12 |
| 06381 | C33-5 | 0.465 | 0.185 | Cet | −2 | 2.90 | 9.46 |
| 06258 | C35-5 | 0.873 | 0.428 | McC | −6 | 7.64 | 10.14 |
| 06086 | C41-7 | 0.1242 | 0.072 | Cet | −2 | 2.91 | 10.14 |
| 06384 | C47-2 | 0.180 | 0.010 | McC | −6 | 7.07 | 9.62 |
| 06386 | C47-4 | 0.121 | 0.047 | McC | −5 | 6.07 | 9.62 |
| 06097 | C64-2 | 1.4550 | 1.029 | McC | −5 | 6.03 | 9.80 |
| 06099 | C64-5 | 0.1175 | 0.068 | Cet | −2 | 3.03 | 9.80 |
| 06100 | C64-6 | 1.1225 | 0.794 | Cet | −2 | 3.03 | 9.8 |
| 06006 | C81-1 | 0.2850 | 0.202 | McC | −5 | 5.96 | 9.64 |
| 06007 | C81-2 | 0.3200 | 0.226 | McC | −5 | 5.96 | 9.64 |
| 06016 | C85-1 | 0.7540 | 0.435 | McC | −7 | 8.01 | 10.16 |
| 06019 | C85-5 | 1.4775 | 1.045 | Cet | −2 | 3.01 | 10.16 |
| 06394 | C87-7 | 0.130 | 0.030 | MRS | −2 | 3.03 | 9.42 |
| 06020 | C92-1 | 0.1253 | 0.072 | McC | −5 | 6.09 | 9.64 |
| 06021 | C92-2 | 0.1678 | 0.097 | McC | −4 | 5.09 | 9.64 |
| 06022 | C92-4 | 0.1229 | 0.071 | McC | −2 | 3.09 | 9.64 |
| 06396 | C95-1 | 4.975 | 2.575 | McC | −6 | 7.1 | 9.75 |
| 06037 | C102-1 | 0.6767 | 0.391 | McC | −6 | 6.90 | 8.55 |
| 06040 | C102-7 | 0.2342 | 0.135 | CS ana | −6 | 6.9 | 8.55 |
| 06080 | C107-2 | 0.5050 | 0.357 | McC | −6 | 7.1 | 9.55 |
| 06042 | C107-3 | 0.1900 | 0.110 | McC | −6 | 7.1 | 9.55 |
| 06043 | C107-5 | 1.7600 | 1.245 | McC | −6 | 7.1 | 9.55 |
| 06045 | C107-10 | 0.1975 | 0.140 | Cet | −2 | 3.1 | 9.55 |
| 06046 | C108-2 | 0.3925 | 0.278 | McC | −6 | 7.12 | 10.54 |
| 06049 | C108-10 | 0.2425 | 0.171 | CS ana | −7 | 8.12 | 10.54 |
| 06057 | C133-1 | 0.2475 | 0.175 | McC | −6 | 6.98 | 10.49 |
| 06101 | C133-4 | 0.1809 | 0.090 | Cet | −2 | 2.98 | 10.49 |
| 06160 | C189-2 | 1.3483 | 0.778 | McC | −6 | 7.07 | 10.19 |
| 06164 | C189-16B | 0.3295 | 0.190 | CSH | −8 | 8.07 | 10.19 |
| 06176 | C191-4 | 0.3975 | 0.281 | McC | −5 | 5.96 | 10.34 |
| 06177 | C191-5 | 0.3185 | 0.225 | McC | −5 | 5.96 | 10.34 |
| 06293 | C207-6 | 0.175 | 0.111 | Cet | −2 | 2.93 | 10.13 |
| 06295 | C208-6 | 0.116 | 0.047 | Cet | −2 | 2.91 | 10.57 |
| 06301 | C211-1 | 0.285 | 0.242 | McC | −2 | 2.87 | 10.07 |
| 06329 | C218-2 | 0.649 | 0.439 | McC | −6 | 6.88 | 10.06 |
| 06338 | C218-13 | 0.208 | 0.047 | Cet | −5 | 5.88 | 10.06 |
| 06341 | C218-16 | 0.304 | 0.218 | Cet | −4 | 4.88 | 10.06 |
| 07064 | C225-1 | 0.1280 | 0.0058 | McC | −4 | 4.90 | 10.10 |
| 07065 | C225-2 | 0.8354 | 0.7146 | McC | −4 | 4.90 | 10.10 |
| 07066 | C225-5 | 0.9200 | 0.4150 | McC | −6 | 6.87 | 9.49 |
| 07067 | C225-6 | 1.0792 | 0.5977 | McC | −5 | 5.87 | 9.49 |
| 07068 | C226-1 | 0.1193 | 0.0334 | McC | −5 | 6.06 | 10.58 |
| 07073 | C227-4 | 0.2164 | 0.1568 | Cet | −2 | 2.88 | 10.06 |
| 07120 | C228-2 | 0.228 | 0.013 | McC | −2 | 3.17 | 9.72 |
| 07121 | C229-1 | 0.126 | 0.012 | McC | −5 | 6.06 | 9.50 |
| 07122 | C229-2 | 0.117 | 0.034 | McC | −4 | 5.06 | 9.50 |
| 07123 | C229-7 | 0.190 | 0.045 | Cet | −5 | 6.06 | 9.50 |
| 07131 | C232-5 | 0.190 | 0.122 | Cet | −2 | 2.98 | 9.60 |
| 07138 | C235-1 | 0.658 | 0.193 | McC | −5 | 6.02 | 9.42 |
| | | AIEC isolated from control subjects | | | | |
| 06235 | C174-6 | 2.833 | 2.468 | Cet | −2 | 3.05 | 10.59 |
| 06242 | C177-1 | 0.251 | 0.175 | McC | −6 | 6.99 | 9.95 |
| 06103 | C177-13 | 0.1461 | 0.073 | CS ana | −7 | 7.99 | 9.95 |
| 06105 | C177-2 | 0.1571 | 0.079 | McC | −5 | 5.99 | 9.95 |
| 06106 | C178-23 | 0.4527 | 0.261 | CSH | −5 | 6.03 | 10.24 |
| 06108 | C179-7 | 0.1103 | 0.064 | Cet | −2 | 3.07 | 10.53 |
| 06142 | C181-5 | 1.1525 | 0.815 | Cet | −3 | 4.01 | 9.96 |
| 06143 | C183-12 | 0.2117 | 0.122 | CSH | −7 | 8.2 | 9.95 |
| 06121 | C183-2 | 0.1867 | 0.108 | McC | −4 | 5.2 | 9.95 |
| 06122 | C183-5 | 1.1025 | 0.780 | Cet | −2 | 3.20 | 9.95 |
| 06145 | C184-17 | 0.1095 | 0.077 | CSH | −5 | 6.09 | 9.64 |
| 06146 | C185-22 | 0.3933 | 0.227 | CSH | −5 | 5.88 | 9.88 |
| 06126 | C185-1 | 0.6050 | 0.428 | McC | −4 | 4.88 | 9.88 |
| 06135 | C185-2 | 0.4500 | 0.318 | McC | −5 | 5.88 | 9.88 |

TABLE 1-continued

AIEC strains

| Number | Reference | Invasion I-407 Mean (%) | Invasion I-407 SEM (%) | Culture Medium [1] | Dilution | Level of E. coli (log UFC/g) [2] | Total Count (logUFC/g) [3] |
|---|---|---|---|---|---|---|---|
| 06136 | C185-3 | 0.4875 | 0.345 | McC | −2 | 2.88 | 9.88 |
| 06137 | C185-6 | 0.3125 | 0.221 | Cet | −2 | 2.88 | 9.88 |
| 06127 | C186-1 | 0.1063 | 0.053 | McC | −6 | 6.86 | 10.04 |
| 06129 | C186-4 | 0.4700 | 0.332 | Cet | −3 | 3.86 | 10.04 |
| 06158 | C188-15 | 0.1052 | 0.061 | CS ana | −6 | 6.94 | 9.60 |
| 06196 | C192-11 | 0.508 | 0.279 | Cet | −2 | 2.92 | 9.44 |
| 06197 | C195-1 | 0.206 | 0.157 | McC | −5 | 5.95 | 9.72 |
| 06198 | C195-2 | 1.806 | 1.363 | McC | −4 | 4.95 | 9.72 |
| 06200 | C195-6 | 2.498 | 1.482 | Cet | −2 | 2.95 | 9.72 |
| 06201 | C196-1 | 0.218 | 0.105 | McC | −7 | 7.87 | 9.61 |
| 06204 | C196-4 | 0.307 | 0.163 | McC | −5 | 5.87 | 9.61 |
| 06212 | C197-1 | 3.133 | 1.438 | McC | −6 | 6.86 | 10.32 |
| 06213 | C197-2 | 0.445 | 0.042 | McC | −6 | 6.86 | 10.32 |
| 06216 | C197-6 | 0.886 | 0.782 | Cet | −2 | 2.86 | 10.32 |
| 06217 | C198-1 | 0.143 | 0.112 | McC | −6 | 7.07 | 10.03 |
| 06218 | C198-2 | 0.113 | 0.096 | McC | −6 | 7.07 | 10.03 |
| 06221 | C199-3 | 5.367 | 3.132 | McC | −4 | 5.06 | 9.79 |
| 06222 | C199-4 | 1.353 | 0.942 | McC | −3 | 4.06 | 9.79 |
| 06223 | C199-5 | 2.980 | 2.122 | McC | −3 | 4.06 | 9.79 |
| 06224 | C199-6 | 5.398 | 2.837 | McC | −3 | 4.06 | 9.79 |
| 06225 | C200-1 | 0.538 | 0.277 | McC | −3 | 4.06 | 9.79 |
| 07032 | C222-1 | 0.1038 | 0.0783 | McC | −6 | 7.14 | 10.88 |
| 07033 | C222-2 | 1.2425 | 0.6575 | McC | −6 | 7.14 | 10.88 |
| 07125 | C230-1 | 0.300 | 0.055 | McC | −5 | 6.0 | 10.2 |

[1] McC = McConkey Agar (bioMérieux)
Cet = Cetrimide Agar (bioMérieux)
CS ana = anaerobic Columbia blood agar
MRS = Man Rogosa Sharp Agar (Oxoid)
CSH = Columbia SH Agar
[2] The "level of E. coli" refers to the amount of the AIEC strain in the feces.
[3] "Total Count" refers to all bacterial species in feces.

CS ana culture medium has the following composition (per liter medium):
10-39 g of Columbia blood agar base (Oxoid)
5 g of glucose
0.3 g of cysteine chlorohydrate
5 g of agar
pH 7.0±0.2

The mixture is sterilized for 15 minutes at 121° C. Just before plating, 5% of horse blood is added.

CSH culture medium has the following composition (per liter medium):
39 g of Columbia blood agar base (Oxoid)
3 g of cysteine chlorohydrate
pH 6.8±0.2

The mixture is sterilized for 15 minutes at 121° C. Just before plating, 2 ml of sterile ammonium citrate solution (0.25 g/10 ml water) are added. After incubation, bacteria using cysteine (and releasing sulfide) result in black colonies on this medium.

Example 2

Phage Isolation

Phages were isolated from sewage water as follows: sewage water was filtered at 0.2 μm and mixed with an equal volume of 2× Luria-Bertani (LB) medium. This mixture was inoculated with a fresh culture of LF82 strain and incubated on a shaker at 37° C. overnight. Chloroform (1/10 volume) was added to the flask and placed on a shaker for one hour. The medium was centrifuged at 10,000 g for 10 min. 1 ml of the supernatant was collected and 1/10 vol. of chloroform was added. After a brief mix by vortex, the Eppendorf tube was centrifuged at 7,500 g for 5 min. To determine if phages were present in this extract, a drop (10 μl) of the supernatant was applied on an LB agar plate and allowed to dry. Using a platinum wire, the plate was streaked from the drop through the rest of the plate to isolate individual phages. 1 ml of a growing culture of LF82 strain was applied to cover the entire plate; the excess was removed and the plate was incubated at 37° C. overnight. One or two plaques were picked up and resuspended in 200 μl of SM buffer (10 mM TrisHCl pH7, NaCl 200 mM, gelatin 0.03%). 20 μl of chloroform was added in each tube and tubes were briefly mixed by vortex and centrifuged at 7,500 g for 5 min. 10 μl of the supernatant was applied on a LB plate and allowed to dry and the previous procedure was repeated at least three times. Once the majority of isolated plaques were homogenous, 10 μl of the last resuspended plaque were added to 1 ml of growing culture of LF82 strain at OD 0.1 at 600 nm. This culture tube was incubated at 37° C. for 2 to 4 hours until lysis occurred. After addition of 1/10 vol. of chloroform, the culture was transferred to an Eppendorf tube, centrifuged at 7,500 g for 5 min and cooled to 4° C., thereby obtaining the primary stock. Several dilutions of this stock were kept at 4° C. and used to infect a larger volume of culture in order to prepare larger amounts of phages. Seven (7) phages were obtained as follows:

vB_EcoM_LF82_P1 (herein before and after P1) deposited with the French National Collection of Microorganisms at the Institut Pasteur under Accession Number CNCM I-4694;

vB_EcoM_LF82_P2 (herein before and after P2) deposited with the French National Collection of Microorganisms at the Institut Pasteur under Accession Number CNCM I-4695;

vB_EcoM_LF82_P3 (herein before and after P3) deposited with the French National Collection of Microorganisms at the Institut Pasteur under Accession Number CNCM I-4696;

vB_EcoM_LF82_P4 (herein before and after P4) deposited with the French National Collection of Microorganisms at the Institut Pasteur under Accession Number CNCM I-4697;

vB_EcoM_LF82_P5 (herein before and after P5) deposited with the French National Collection of Microorganisms at the Institut Pasteur under Accession Number CNCM I-4698;

vB_EcoM_LF82_P6 (herein before and after P6) deposited with the French National Collection of Microorganisms at the Institut Pasteur under Accession Number CNCM I-4699; and vB_EcoM_LF82_P8 (herein before and after P8) deposited with the French National Collection of Microorganisms at the Institut Pasteur under Accession Number CNCM I-4700.

CLB_P2, deposited with the French National Collection of Microorganisms at the Institut Pasteur under Accession Number CNCM I-4675, and its isolation is described in detail in Maura et al. Environmental Microbiology (2012) 14 (8), 1844-1854.

P1 to P6 phages belong to the wV8 bacteriophage family. P8 belongs to the RB69 bacteriophage family. CLB_P2 belongs to the JS98 bacteriophage family.

The classification into the wV8, RB69 and JS98 bacteriophage families was done based on the sequence of the major capsid protein.

Example 3

In Vitro Assays of the Infectivity of Bacteriophages in AIEC Strains

Plaque assay was carried out by contacting serial dilutions of bacteriophage solutions (from not diluted to 10-8 dilution) with a Petri dish which surface was covered by one bacterium. After overnight incubation at 37° C. plaques were counted. When the bacterium tested was the bacterial host (reference host) used to isolate bacteriophages it was considered that the plaque assay gave an efficiency of 100%. When the bacterium tested was not the original host, then the results were expressed by comparison to the reference host. A result greater than 80% (+++) means that the bacterium is a highly efficient host compared to the reference host, while a result between 0.1 and 80% (++) means that the bacterium is an efficient host, and a result below 0.1% (+) but above 0 means that the bacterium is a moderately efficient host, and finally 0 (−) means that the bacterium is totally resistant.

Results

Table 2 shows the result of the host spectrum of the 8 phages (as isolated/identified in Example 2) on 38 strains (out of the 166 strains isolated in Example 1, Table 1)

TABLE 2

Strains tested and effective efficiency of plating (EOP) obtained for each bacteriophage

| Bacterial Strain | Bacteriophage | | | | | | | |
|---|---|---|---|---|---|---|---|---|
| | P1 | P2 | P3 | P4 | P5 | P6 | P8 | CLB_P2 |
| LF82 | +++ | +++ | +++ | +++ | +++ | +++ | +++ | +++ |
| 06023 | − | − | − | − | − | − | − | ++ |
| 06030 | − | − | − | − | − | − | + | +++ |

TABLE 2-continued

Strains tested and effective efficiency of plating (EOP) obtained for each bacteriophage

| Bacterial Strain | Bacteriophage | | | | | | | |
|---|---|---|---|---|---|---|---|---|
| | P1 | P2 | P3 | P4 | P5 | P6 | P8 | CLB_P2 |
| 06033 | ++ | ++ | ++ | ++ | ++ | ++ | + | +++ |
| 06066 | − | − | − | − | − | − | +++ | − |
| 06072 | − | − | − | − | − | − | + | ++ |
| 06073 | − | − | − | − | − | − | + | +++ |
| 06075 | +++ | +++ | +++ | +++ | +++ | +++ | + | ++ |
| 06088 | ++ | ++ | ++ | ++ | ++ | ++ | − | − |
| 06089 | ++ | ++ | ++ | ++ | ++ | ++ | − | − |
| 06122 | ++ | ++ | ++ | ++ | ++ | ++ | − | − |
| 06150 | − | − | − | − | − | − | + | − |
| 06351 | ++ | ++ | ++ | ++ | ++ | ++ | − | ++ |
| 06353 | + | + | + | + | + | + | − | − |
| 06354 | − | − | − | − | − | − | − | − |
| 06356 | ++ | + | + | + | + | + | − | − |
| 06357 | + | + | + | + | + | + | − | − |
| 06358 | ++ | + | + | + | + | + | − | − |
| 06359 | ++ | + | + | + | + | + | − | − |
| 06361 | + | ++ | + | + | + | + | + | − |
| 06362 | − | − | − | − | − | − | − | − |
| 07045 | − | − | − | − | − | − | − | − |
| 07046 | − | − | − | − | − | − | − | ++ |
| 07048 | − | − | − | − | − | − | − | − |
| 07051 | − | − | − | − | − | − | − | − |
| 07075 | − | − | − | − | − | − | − | − |
| 07076 | ++ | +++ | ++ | + | + | + | +++ | ++ |
| 07077 | − | − | − | − | − | − | − | − |
| 07078 | ++ | +++ | + | + | + | + | + | ++ |
| 07081 | ++ | +++ | ++ | + | + | ++ | +++ | ++ |
| 07082 | +++ | +++ | +++ | +++ | +++ | +++ | +++ | ++ |
| 07107 | +++ | ++ | +++ | ++ | +++ | +++ | − | +++ |
| 07126 | +++ | +++ | +++ | +++ | +++ | +++ | − | ++ |
| 07127 | +++ | ++ | +++ | +++ | ++ | ++ | − | ++ |
| 07128 | − | − | − | − | − | − | − | ++ |
| 07134 | − | − | − | − | − | − | − | − |
| 07135 | − | − | − | − | − | − | − | ++ |
| 07136 | − | − | − | − | − | − | − | − |
| 07137 | − | − | − | − | − | − | ++ | − |

TABLE 3 number of strains infected by phages:

| Efficacy | P1 | P2 | P3 | P4 | P5 | P6 | P8 | CLB_P2 |
|---|---|---|---|---|---|---|---|---|
| + | 3 | 5 | 6 | 9 | 9 | 8 | 8 | 0 |
| ++ | 10 | 8 | 8 | 6 | 6 | 7 | 1 | 13 |
| +++ | 5 | 6 | 5 | 4 | 4 | 4 | 4 | 5 |
| Total/38 | 18 | 19 | 19 | 19 | 19 | 19 | 13 | 18 |

Numbers indicate the number of strains infected by one bacteriophage

Example 4

In Vivo Replication of Bacteriophages in the Gut of Mice

In vivo replication of bacteriophages in the gut of mice was evaluated as follows:

First, the strain LF82 was engineered to carry two antibiotic resistance genes conferring respectively resistance to Streptomycin and Kanamycin. This new bacterial strain was named LF82SK and its invasive properties were verified as to be similar to the original LF82 strain.

Three (3) groups of two (2) mice each:
Group 1: non-colonized mice+phages
Group 2: LF82SK colonized mice
Group 3: LF82SK colonized mice+phages Streptomycin (5 g/L) was added to drinking water of all animals 3 days before day 0 and kept along the experiment.

At day 0, LF82SK was administered to Group 2 and 3 in order to allow the strain to colonize mice's gut.

At day 4, 200 µl of a cocktail of P2+P6 bacteriophages was administered to Group 1 and 3 (gavage solution $10^8$ pfu/ml) once in the morning and once in the afternoon. P2+P6 bacteriophages were also added to the drinking water ($10^8$ pfu/ml). At day 5 in the morning, mice were sacrificed to evaluate the number of bacteria and bacteriophages in the ileum and in the feces.

Results:

Bacteria (*E. coli*):
- Group 1: no bacteria;
- Group 2: in ileum—$10^6$ cfu/g organ; in feces—$10^8$ cfu/organ;
- Group 3: in ileum and feces: bacteria all lysed by phages.

Phages:
- Group 1: in ileum—$10^6$ pfu/g organ; in feces—$10^7$ pfu/organ;
- Group 2: no phages
- Group 3: in ileum—$10^6$ pfu/g organ; in feces—$10^{10}$ pfu/organ;

In the feces, there were 100 times more phages in Group 3 than in Group 1 showing the multiplication of the phages in vivo.

Example 5

In Vivo Replication of Bacteriophages in the Gut of Mice

In vivo replication of bacteriophages in the gut of mice was evaluated as follows:

12 mice were dispatched into three (3) groups of four (4) mice each:
- Group 1: non-colonized mice+phages
- Group 2: LF82SK-colonized mice
- Group 3: LF82SK-colonized mice+phages Streptomycin (5 g/L) was added to drinking water of all animals 3 days before day 0 and kept along the experiment.

At day 0, LF82SK was given to mice of Group 2 and 3 in order to allow the strain to colonize mice's gut.

At day 4, bacteriophages (cocktail of P2+P6+P8 at $10^8$ pfu/mL each) were added in the drinking water of Group 1 and 3.

At day 5, mice were sacrificed to evaluate the number of bacteria and bacteriophages in the ileum and in the feces. 100 µl of ileal homogenates from the three groups were taken to extract whole DNA using Maxwell® 16 Tissue DNA purification kit from Promega.

Results:

Bacteria (*E. coli*):
- Group 1: no bacteria;
- Group 2: in ileum—$3.2 \cdot 10^6$ cfu/g of organ; in feces—$1.2 \cdot 10^9$ cfu/g of feces;
- Group 3: in ileum and feces: bacteria all lysed by phages.

Phages:
- Group 1: in ileum—$1.4 \cdot 10^6$ pfu/g of organ; in feces—$5.2 \cdot 10^6$ pfu/g of feces;
- Group 2: no phages
- Group 3: in ileum—$2.6 \cdot 10^6$ pfu/g of organ; in feces—$1.0 \cdot 10^9$ pfu/g of feces;

In the feces, there were 200 times more phages in Group 3 than in Group 1 showing the multiplication of the phages in vivo.

DNA extracted from ileal sections was used to run quantitative PCR using two sets of primers. One set of primers (SEQ ID NO: 30-31) served to amplify DNA from "all bacteria" present in the sample while the second set (SEQ ID NO: 32-33) was used to amplify specifically DNA from "*E. coli*" bacteria. After normalization, results were expressed as the ratio of *E. coli* versus all bacteria.

- Group 1: qPCR amplifications were successful with all bacteria primers but not with *E. coli* primers. The ratio could not be calculated.
- Group 2: qPCR amplifications were successful with both set of primers. The average ratio was 0.6 (60% of total bacteria were *E. coli* bacteria)
- Group 3: qPCR amplifications were successful with both set of primers. The average ratio was 0.1 (10% of total bacteria were *E. coli* bacteria). Note that one mouse displayed a ratio of 0.4 while the three others displayed much lower values (0.06; 0.0002; 0.002). In consequence bacteriophages were able to reduce the level of ileal colonization of LF82 bacteria by at least one order of magnitude in three mice out of four.

Example 6

In Vivo Assay of the Infectivity of Bacteriophages

Two cocktails of phages are selected for testing in wild-type (WT) mice and in CEACAM6 mice infected with the LF82 *E. coli* strain isolated from the CD patients.

In both WT mice and in CEACAM6 mice infected with the LF82 *E. coli* strain isolated from the CD patients, bacteriophages are administered to the mice by oral gavage in CMC. This kind of administration has many advantages: known quantity of bacteriophage administration and immediate gastric acidity neutralization. Phages are daily administered to the mice during the entire study.

Mice are sacrificed at 5 days after LF82 administration.

Main criteria: quantification of LF82 in ileal and colonic adherent flora of the mice.

Minor criteria:
- Evaluation of weight
- Stool consistency.
- Presence of fecal blood (macro and bio)
- Luminal flora (conventional flora+LF82+phages)
  - At sacrifice: Macroscopic and histologic examinations, adherent ileal and colonic flora+LF82+phages,
  - At sacrifice: Macroscopic and histologic examinations, adherent ileal and colonic flora+LF82+phages, Biological parameters of inflammation are monitored, and bacteriophage translocation in the mesenteric lymph nodes (MLN), liver and spleen is searched for.

Inflammation markers (MPO, pro-inflammatory cytokines IL-6, IL-12 and anti-inflammatory cytokines IL-10) are monitored. Bacteriophage and AIEC translocation in MLN, liver and spleen is searched for.

Follow-up of bacteriophage elimination takes place in stools of mice receiving the bacteriophage cocktail without the LF82 strain.

Example 7

In Vivo Assay of a Cocktail of Phages on the LF82 Strain.

In vivo replication of bacteriophages (cocktail of P2+P6+P8+CLB_P2) in the gut of mice was evaluated as follows:

20 mice were dispatched into two (2) groups of ten (10) mice each:
- Group 1: LF82SK-colonized mice
- Group 2: LF82SK-colonized mice+phages Streptomycin (5 g/L) was added to drinking water of all animals 3 days before day 0 and kept along the experiment.

At day 0, LF82SK was given to mice of both groups in order to allow the strain to colonize mice's gut.

At day 3, bacteriophages (cocktail of P2+P6+P8+CLB_P2 at $10^8$ pfu/mL each) were given to mice of Group 2 by gavage.

At day 4 and 7, 5 mice of each group were sacrificed to evaluate the number of bacteria and bacteriophages in the ileum, in the colon and in the feces. 100 µl of ileal and colonic homogenates from the two groups were taken to extract whole DNA using Maxwell® 16 Tissue DNA purification kit from Promega.

Results:
Level of LF82 in Stools:
　At day 4 and 7 levels of LF82 were:
　　in group 1:7 $10^9$; 1 $10^9$ cfu/g
　　in group 2:8 $10^7$; 5 $10^8$ cfu/g
Level of Phages in Stools:
　At day 4 and 7 levels of Phages were:
　　in group 1: none
　　in group 2:5 $10^9$; 6 $10^9$ pfu/g In the presence of the phage cocktail the level of LF82 in stools was significantly lower than in their absence showing that the phage cocktail was able to infect LF82 inside mice's gut.

Level of LF82 in Organs:
　at day 4 levels of LF82 were:
　　in ileum of group 1: 100% of bacteria are *E. coli* (LF82)
　　in ileum of group 2: 20% of bacteria are *E. coli* (LF82)
　　in colon of group 1: 40% of bacteria are *E. coli* (LF82)
　　in colon of group 2: 2% of bacteria are *E. coli* (LF82)
　at day 7 levels of LF82 were:
　　in ileum of group 1: 100% of bacteria are *E. coli* (LF82)
　　in ileum of group 2: 50% of bacteria are *E. coli* (LF82)
　　in colon of group 1: 25% of bacteria are *E. coli* (LF82)
　　in colon of group 2: 10% of bacteria are *E. coli* (LF82)
Level of Phages in Organs:
　at day 4 levels of Phages were:
　　in ileum of group 1: none
　　in ileum of group 2:7 $10^8$ pfu/g
　　in colon of group 1: none
　　in colon of group 2:5 $10^{10}$ pfu/g
　at day 7 levels of LF82 were:
　　in ileum of group 1: none
　　in ileum of group 2:7 $10^8$ pfu/g
　　in colon of group 1: none
　　in colon of group 4:2 $10^8$ pfu/g At day 2 and 5 the level of LF82 was reduced in both ileum and colon in the group treated by phages. This shows that phages infect LF82 in gut sections and not only in stools. Concomitantly, the level of phages at day 7 stays as high as at day 2 showing that phage can last several days in the gut after a unique initial administration.

Example 8

In Vivo Assay of the Infectivity of Bacteriophages

In vivo assay of the infectivity of bacteriophages (cocktail of P2+P6+P8) in CEACAM6 mice infected with LF82SK was evaluated as follows:

48 mice were dispatched into three (4) groups as follows:
Group 1: non-colonized mice (8 mice)
Group 2: non-colonized mice+phages (12 mice)
Group 3: LF82SK-colonized mice (16 mice)
Group 4: LF82SK-colonized mice+phages (12 mice)

DSS (dextran sulfate) 0.25% was introduced in the drinking water 3 days before day 0 and kept along the experiment.

Streptomycin (5 mg) was administered by oral gavage to all animals 1 day before day 0.

At day 0, LF82SK was administered to mice of Group 3 and 4 in order to allow the strain to colonize mice's gut.

At day 1, phages (cocktail of P2+P6+P8 at $10^7$ pfu/mL each) were administered once to each mouse of Group 2 and 4 by oral gavage in CMC. This kind of administration has many advantages: known quantity of bacteriophage administration and immediate gastric acidity neutralization.

At day 1, 4 mice from Group 3 were sacrificed to evaluate the number of bacteria in the ileum, in the colon and in the feces before the administration of phages.

At day 2, respectively 4, 6, 6 and 6 mice from Groups 1, 2, 3 and 4 were sacrificed to evaluate the number of bacteria and bacteriophages in the ileum, in the colon and in the feces.

At day 5, respectively 4, 6, 6 and 6 mice from Groups 1, 2, 3 and 4 were sacrificed to evaluate the number of bacteria and bacteriophages in the ileum, in the colon and in the feces.

100 µl of ileal, colon and feces homogenates from the four groups were taken to extract whole DNA using Maxwell® 16 Tissue DNA purification kit from Promega. Weight, stool consistency and presence of fecal blood were monitored daily.

DNA extracted from ileal sections was used to run quantitative PCR using one set of primers (SEQ ID NO: 44-45) to amplify a specific gene (pMT1) from LF82. Results were expressed as the number of copies of this gene per gram of tissues.

```
                                         (SEQ ID NO: 44)
       LF82 pMT1 F CCATTCATGCAGCAGCTCTTT (SEQ ID NO: 45)
       LF82 pMT1 R ATCGGACAACATTAGCGGTGT
```

Results:

Values represent the median values obtained for each group of mice.

In group 1, neither LF82 nor Phages were detected along the experiment.

Level of LF82 in Stools:
　At day 1: the level of LF82 in Groups 3 and 4 were 5 $10^9$ and 6 $10^9$ cfu/g resp.
　At day 2, 3 and 5 levels of LF82 were:
　　in group 3:3 $10^9$; 5 $10^8$; 5 $10^7$ cfu/g
　　in group 4:5 $10^5$; 5 $10^5$; 5 $10^3$ cfu/g
Level of Phages in Stools:
　At day 2, 3 and 5 levels of Phages were:
　　in group 2:5 $10^5$ pfu/g; not detected; not detected
　　in group 4:1 $10^9$; 1 $10^7$; 5 $10^6$ pfu/g In the presence of phages the level of LF82 in stools was significantly lower than in their absence. Concomitantly, the level of phages was significantly higher in mice colonised by LF82 than in LF82-free mice. Both data confirmed that phages can infect LF82 in the gut.

Level of LF82 in Organs:
　at day 2 levels of LF82 were:
　　in ileum of group 3:2 $10^6$ copies of pMT1/g
　　in ileum of group 4:8 $10^4$ copies of pMT1/g
　　in colon of group 3:2 $10^7$ copies of pMT1/g
　　in colon of group 4:1 $10^5$ copies of pMT1/g
　at day 5 levels of LF82 were:
　　in ileum of group 3:5 $10^4$ copies of pMT1/g
　　in ileum of group 4:8 $10^4$ copies of pMT1/g
　　in colon of group 3:6 $10^6$ copies of pMT1/g
　　in colon of group 4:2 $10^5$ copies of pMT1/g Level of Phages in Organs:
at day 2 levels of Phages were:
in ileum of group 2: not detected
in ileum of group 4:8 $10^5$ pfu/g
in colon of group 2:5 $10^4$ pfu/g
in colon of group 4:5 $10^6$ pfu/g
at day 5 levels of LF82 were:
in ileum of group 2: not detected
in ileum of group 4: not detected
in colon of group 2: not detected
in colon of group 4:2 $10^4$ pfu/g At day 2, the level of LF82 was reduced in both ileum and colon in the group treated by phages. This shows that phages infected LF82 in gut sections and not only in stools. Concomitantly, the level of phages was significantly higher in mice colonised by LF82 than in LF82-free mice.

At day 5, the level of LF82 in ileum was too weak to see a difference between the two groups while in colon samples the level of LF82 was still reduced in the group that received phages compared to the groups that did not. Concomitantly, we could only detect phages in colon of mice colonised by LF82. This shows that the effect of phages in reducing LF82 can last several days after the initial administration.

Despite high colonisation level of LF82 observed in this experiment, no sign of colitis was observed in any of the groups.

EMBODIMENTS

The present invention in particular relates to the following embodiments:

1. A pharmaceutical composition comprising:
    (i) at least one bacteriophage strain(s) capable of producing a lytic infection in an adherent-invasive *Escherichia coli* strain; and
    (ii) a pharmaceutically acceptable carrier;
    for use in the treatment of inflammatory bowel disease.
2. A composition according to embodiment 1 wherein the adherent-invasive *Escherichia coli* strain is present in one or more of the intestinal parts (small and large) of the subject.
3. A composition according to embodiment 1 wherein the adherent-invasive *Escherichia coli* strain is LF82, 07081, 07082, 07076 or 06075.
4. A composition according to any one of embodiments 1 to 3 wherein the inflammatory bowel disease is Crohn's disease or ulcerative colitis or recurrence of ileal lesions after surgery, for example surgery for the removal of at least a part of the small intestine in CD patients.
5. A composition according to any one of embodiments 1 to 4 wherein the composition comprises at least one of the bacteriophage strain P1 deposited with the French National Collection of Microorganisms at the Institut Pasteur under Accession Number CNCM I-4694 or a variant thereof, wherein the variant has the same lytic activity, preferably the same lytic activity and the same phenotypic characteristics as said bacteriophage strain P1, the bacteriophage strain P2 deposited with the French National Collection of Microorganisms at the Institut Pasteur under Accession Number CNCM I-4695 or a variant thereof, wherein the variant has the same lytic activity, preferably the same lytic activity and the same phenotypic characteristics as said bacteriophage strain P2, the bacteriophage strain P3 deposited with the French National Collection of Microorganisms at the Institut Pasteur under Accession Number CNCM I-4696 or a variant thereof, wherein the variant has the same lytic activity, preferably the same lytic activity and the same phenotypic characteristics as said bacteriophage strain P3, the bacteriophage strain P4 deposited with the French National Collection of Microorganisms at the Institut Pasteur under Accession Number CNCM I-4697 or a variant thereof, wherein the variant has the same lytic activity, preferably the same lytic activity and the same phenotypic characteristics as said bacteriophage strain P4, the bacteriophage strain P5 deposited with the French National Collection of Microorganisms at the Institut Pasteur under Accession Number CNCM I-4698 or a variant thereof, wherein the variant has the same lytic activity, preferably the same lytic activity and the same phenotypic characteristics as said bacteriophage strain P5, the bacteriophage strain P6 deposited with the French National Collection of Microorganisms at the Institut Pasteur under Accession Number CNCM I-4699 or a variant thereof, wherein the variant has the same lytic activity, preferably the same lytic activity and the same phenotypic characteristics as said bacteriophage strain P6, the bacteriophage strain P8 deposited with the French National Collection of Microorganisms at the Institut Pasteur under Accession Number CNCM I-4700 or a variant thereof, wherein the variant has the same lytic activity, preferably the same lytic activity and the same phenotypic characteristics as said bacteriophage strain P8 and the bacteriophage strain CLB_P2 deposited with the French National Collection of Microorganisms at the Institut Pasteur under Accession Number CNCM I-4675 or a variant thereof, wherein the variant has the same lytic activity, preferably the same lytic activity and the same phenotypic characteristics as said bacteriophage strain CLB_P2.
6. A composition according to any one of embodiments 1 to 5 wherein the composition is for oral administration.
7. Bacteriophage strain P1 deposited with the French National Collection of Microorganisms at the Institut Pasteur under Accession Number CNCM I-4694 or a variant thereof, wherein the variant has the same lytic activity, preferably the same lytic activity and the same phenotypic characteristics as said bacteriophage strain.
8. Bacteriophage strain P2 deposited with the French National Collection of Microorganisms at the Institut Pasteur under Accession Number CNCM I-4695 or a variant thereof, wherein the variant has the same lytic activity, preferably the same lytic activity and the same phenotypic characteristics as said bacteriophage strain.
9. Bacteriophage strain P3 deposited with the French National Collection of Microorganisms at the Institut Pasteur under Accession Number CNCM I-4696 or a variant thereof, wherein the variant has the same lytic activity, preferably the same lytic activity and the same phenotypic characteristics as said bacteriophage strain.
10. Bacteriophage strain P4 deposited with the French National Collection of Microorganisms at the Institut Pasteur under Accession Number CNCM I-4697 or a variant thereof, wherein the variant has the same lytic activity, preferably the same lytic activity and the same phenotypic characteristics as said bacteriophage strain.
11. Bacteriophage strain P5 deposited with the French National Collection of Microorganisms at the Institut Pasteur under Accession Number CNCM I-4698 or a variant thereof, wherein the variant has the same lytic activity, preferably the same lytic activity and the same phenotypic characteristics as said bacteriophage strain.

12. Bacteriophage strain P6 deposited with the French National Collection of Microorganisms at the Institut Pasteur under Accession Number CNCM I-4699 or a variant thereof, wherein the variant has the same lytic activity, preferably the same lytic activity and the same phenotypic characteristics as said bacteriophage strain.

13. Bacteriophage strain P8 deposited with the French National Collection of Microorganisms at the Institut Pasteur under Accession Number CNCM I-4700 or a variant thereof, wherein the variant has the same lytic activity, preferably the same lytic activity and the same phenotypic characteristics as said bacteriophage strain.

The invention claimed is:

1. A method of treating inflammatory bowel disease comprising administering to a subject in need thereof at least one bacteriophage strain capable of producing a lytic infection in an adherent-invasive *Escherichia coli* strain, thereby treating the subject, wherein the at least one bacteriophage strain is selected from:

the bacteriophage strain P1 deposited with the French National Collection of Microorganisms at the Institut Pasteur under Accession Number CNCM I-4694;

the bacteriophage strain P2 deposited with the French National Collection of Microorganisms at the Institut Pasteur under Accession Number CNCM I-4695;

the bacteriophage strain P3 deposited with the French National Collection of Microorganisms at the Institut Pasteur under Accession Number CNCM I-4696;

the bacteriophage strain P4 deposited with the French National Collection of Microorganisms at the Institut Pasteur under Accession Number CNCM I-4697;

the bacteriophage strain P5 deposited with the French National Collection of Microorganisms at the Institut Pasteur under Accession Number CNCM I-4698;

the bacteriophage strain P6 deposited with the French National Collection of Microorganisms at the Institut Pasteur under Accession Number CNCM I-4699; and the bacteriophage strain P8 deposited with the French National Collection of Microorganisms at the Institut Pasteur under Accession Number CNCM I-4700.

2. A method according to claim 1, further comprising administering to the subject a bacteriophage strain CLB_P2 deposited with the French National Collection of Microorganisms at the Institut Pasteur under Accession Number CNCM I-4675.

3. A method according to claim 1, wherein the adherent-invasive *Escherichia coli* strain is present in one or more of the small intestine and the large intestine of the subject.

4. A method according to claim 1, wherein the adherent-invasive *Escherichia coli* strain is LF82.

5. A method according to claim 1, wherein the inflammatory bowel disease is Crohn's disease.

6. A method according to claim 1, wherein the inflammatory bowel disease is ulcerative colitis.

7. A method according to claim 1, wherein the administering comprises oral administration.

8. A method of treating inflammatory bowel disease comprising administering to a subject in need thereof at least three bacteriophage strains capable of producing a lytic infection in an adherent-invasive *Escherichia coli* strain, thereby treating the subject, wherein the at least three bacteriophage strains comprise:

the bacteriophage strain P2 deposited with the French National Collection of Microorganisms at the Institut Pasteur under Accession Number CNCM I-4695;

the bacteriophage strain P8 deposited with the French National Collection of Microorganisms at the Institut Pasteur under Accession Number CNCM I-4700; and the bacteriophage strain CLB_P2 deposited with the French National Collection of Microorganisms at the Institut Pasteur under Accession Number CNCM I-4675.

9. A method of achieving or maintaining remission of an inflammatory bowel disease comprising administering to a subject in need thereof at least one bacteriophage strain capable of producing a lytic infection in an adherent-invasive *Escherichia coli* strain, thereby treating the subject, wherein the at least one bacteriophage strain is selected from:

the bacteriophage strain P1 deposited with the French National Collection of Microorganisms at the Institut Pasteur under Accession Number CNCM I-4694;

the bacteriophage strain P2 deposited with the French National Collection of Microorganisms at the Institut Pasteur under Accession Number CNCM I-4695;

the bacteriophage strain P3 deposited with the French National Collection of Microorganisms at the Institut Pasteur under Accession Number CNCM I-4696;

the bacteriophage strain P4 deposited with the French National Collection of Microorganisms at the Institut Pasteur under Accession Number CNCM I-4697;

the bacteriophage strain P5 deposited with the French National Collection of Microorganisms at the Institut Pasteur under Accession Number CNCM I-4698;

the bacteriophage strain P6 deposited with the French National Collection of Microorganisms at the Institut Pasteur under Accession Number CNCM I-4699; and the bacteriophage strain P8 deposited with the French National Collection of Microorganisms at the Institut Pasteur under Accession Number CNCM I-4700.

10. A method according to claim 9, further comprising administering to the subject a bacteriophage strain CLB_P2 deposited with the French National Collection of Microorganisms at the Institut Pasteur under Accession Number CNCM I-4675.

11. A method according to claim 9, wherein the adherent-invasive *Escherichia coli* strain is present in one or more of the small intestine and the large intestine of the subject.

12. A method according to claim 9, wherein the adherent-invasive *Escherichia coli* strain is LF82.

13. A method according to claim 9, wherein the inflammatory bowel disease is Crohn's disease.

14. A method of achieving or maintaining remission of an inflammatory bowel disease comprising administering to a subject in need thereof at least three bacteriophage strains capable of producing a lytic infection in an adherent-invasive *Escherichia coli* strain, thereby treating the subject, wherein the at least three bacteriophage strains comprise:

the bacteriophage strain P2 deposited with the French National Collection of Microorganisms at the Institut Pasteur under Accession Number CNCM I-4695;

the bacteriophage strain P8 deposited with the French National Collection of Microorganisms at the Institut Pasteur under Accession Number CNCM I-4700; and the bacteriophage strain CLB_P2 deposited with the French National Collection of Microorganisms at the Institut Pasteur under Accession Number CNCM I-4675.

* * * * *